(12) United States Patent
Song et al.

(10) Patent No.: US 12,354,805 B2
(45) Date of Patent: Jul. 8, 2025

(54) MULTILAYER ELECTRONIC COMPONENT

(71) Applicant: SAMSUNG ELECTRO-MECHANICS CO., LTD., Suwon-si (KR)

(72) Inventors: Jun Il Song, Suwon-si (KR); Sung Hyung Kang, Suwon-si (KR); Sun Joo Hyun, Suwon-si (KR); Dong Uk Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 193 days.

(21) Appl. No.: 17/949,628

(22) Filed: Sep. 21, 2022

(65) Prior Publication Data

US 2023/0178303 A1 Jun. 8, 2023

(30) Foreign Application Priority Data

Dec. 3, 2021 (KR) .................. 10-2021-0171809

(51) Int. Cl.
  *H01G 4/30* (2006.01)
  *H01G 4/008* (2006.01)
  (Continued)

(52) U.S. Cl.
  CPC ............... *H01G 4/30* (2013.01); *H01G 4/008* (2013.01); *H01G 4/012* (2013.01); *H01G 4/12* (2013.01); *H01G 4/224* (2013.01)

(58) Field of Classification Search
  CPC .......... H01G 4/005; H01G 4/008; H01G 4/30; H01G 4/012; H01G 4/12; H01G 4/224
  (Continued)

(56) References Cited

U.S. PATENT DOCUMENTS 8,947,850 B2 2/2015 Togashi
10,643,792 B2 5/2020 Cha
(Continued)

FOREIGN PATENT DOCUMENTS

JP 2000-269074 A 9/2000
JP 2013-38332 A 2/2013
(Continued)

OTHER PUBLICATIONS

Korean Office Action dated Apr. 29, 2025 issued in Korean Patent Application No. 10-2021-0171809 (with English translation).

*Primary Examiner* — Arun Ramaswamy
(74) *Attorney, Agent, or Firm* — Morgan Lewis & Bockius LLP

(57) ABSTRACT

A multilayer electronic component includes: a body including a dielectric layer and first and second internal electrode layers disposed with the dielectric layer interposed therebetween and having opposing first and second surfaces, opposing third and fourth surfaces, and opposing fifth and sixth surfaces; a first external electrode disposed on the third surface and connected to the first internal electrode layer; and a second external electrode disposed on the fourth surface and connected to the second internal electrode layer. The first internal electrode layer includes a first internal electrode, first step compensation portions disposed to be spaced apart from both ends of the first internal electrode, the third surface, and the fourth surface, and first intermediate electrodes disposed between the first internal electrode and the first step compensation portions and disposed to be spaced apart from the third surface and the fourth surface.

20 Claims, 12 Drawing Sheets

(51) Int. Cl.
*H01G 4/012* (2006.01)
*H01G 4/12* (2006.01)
*H01G 4/224* (2006.01)

(58) Field of Classification Search
USPC .................................. 361/301.4, 303, 321.1
See application file for complete search history.

(56) References Cited

U.S. PATENT DOCUMENTS

| | | | |
|---|---|---|---|
| 2012/0314338 A1* | 12/2012 | Togashi | H01G 4/232 |
| | | | 29/25.03 |
| 2013/0038979 A1* | 2/2013 | Togashi | H01G 4/30 |
| | | | 361/301.4 |
| 2016/0240317 A1* | 8/2016 | Ro | H01G 4/30 |
| 2017/0367186 A1* | 12/2017 | Park | H01G 4/236 |
| 2019/0172643 A1* | 6/2019 | Cha | H01G 4/012 |
| 2020/0066450 A1 | 2/2020 | Uenishi et al. | |

FOREIGN PATENT DOCUMENTS

| | | |
|---|---|---|
| JP | 2020-31161 A | 2/2020 |
| KR | 10-2019-0064938 A | 6/2019 |

* cited by examiner

MULTILAYER ELECTRONIC COMPONENT

CROSS-REFERENCE TO RELATED APPLICATION(S)

This application claims benefit of priority to Korean Patent Application No. 10-2021-0171809 filed on Dec. 3, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor, an electronic component, is mounted on the printed circuit boards of several types of electronic products such as an image display device, for example, a liquid crystal display (LCD), a plasma display panel (PDP), and the like, a computer, a personal digital assistant (PDA), a cellular phone, or the like, serving to charge or discharge electricity therein or therefrom.

Such a multilayer ceramic capacitor may be used as a component of various electronic apparatuses due to implementing high capacitance and being easily mounted.

Meanwhile, recently, in accordance with an increase in interest in electrical components in industry, multilayer ceramic capacitors have also been required to have high reliability and high strength characteristics in order to be used in a vehicle or an infotainment system.

In particular, a multilayer layer capacitor has been required to have strength and moisture resistance characteristics in a harsh environment, such that there is a need to improve internal and external structures of the multilayer ceramic capacitor in order to improve moisture resistance reliability and strength.

In the related art, there was an attempt to stack a large number of internal electrodes and dielectric layers having a great thickness in order to secure high reliability. In this case, as a stacking degree increases, bonding force of the multilayer ceramic capacitor may decrease due to warpage of cover portions caused by compression or a step portion between the internal electrodes and margin portions in a process of manufacturing the multilayer ceramic capacitor. As a result, an occurrence frequency of delamination is increased at the time of performing sintering, and thus, a problem in which it is difficult to secure high reliability of the multilayer ceramic capacitor may occur.

Meanwhile, in the related art, a method of printing an internal electrode and then reprinting a dielectric margin has been introduced in order to solve the problem described above. However, such a problem has a problem, in that it may be difficult to control alignment between patterns and precision of the patterns.

SUMMARY

An aspect of the present disclosure may provide a multilayer electronic component of which a problem such as a decrease in bonding strength due to warpage of cover portions or a step portion between internal electrodes and margin portions may be solved.

An aspect of the present disclosure may also provide a multilayer electronic component of which a problem such as a decrease in moisture resistance reliability and generation of cracks due to the decrease in the bonding force may be solved.

However, an aspect of the present disclosure is not limited thereto, and may be more easily understood in a process of describing exemplary embodiments in the present disclosure.

According to an aspect of the present disclosure, a multilayer electronic component may include: a body including dielectric layers and first and second internal electrode layers alternately disposed with each of the dielectric layers interposed therebetween and having first and second surfaces opposing each other in a first direction of the body, third and fourth surfaces connected to the first and second surfaces and opposing each other in a second direction of the body, and fifth and sixth surfaces connected to the first to fourth surfaces and opposing each other in a third direction of the body; a first external electrode disposed on the third surface and connected to the first internal electrode layers; and a second external electrode disposed on the fourth surface and connected to the second internal electrode layers. The first internal electrode layer may include a first internal electrode, first step compensation portions disposed to be spaced apart from both ends of the first internal electrode in the third direction, the third surface, and the fourth surface, and first intermediate electrodes disposed between the first internal electrode and the first step compensation portions and disposed to be spaced apart from the third surface and the fourth surface. The second internal electrode layer may include a second internal electrode, second step compensation portions disposed to be spaced apart from both ends of the second internal electrode in the third direction, the third surface, and the fourth surface, and second intermediate electrodes disposed between the second internal electrode and the second step compensation portions and disposed to be spaced apart from the third surface and the fourth surface.

According to another aspect of the present disclosure, a multilayer electronic component may include: a body including dielectric layers and first and second internal electrode layers alternately disposed with each of the dielectric layers interposed therebetween and having first and second surfaces opposing each other in a first direction of the body, third and fourth surfaces connected to the first and second surfaces and opposing each other in a second direction of the body, and fifth and sixth surfaces connected to the first to fourth surfaces and opposing each other in a third direction of the body; a first external electrode disposed on the third surface and connected to the first internal electrode layers; and a second external electrode disposed on the fourth surface and connected to the second internal electrode layers. The first internal electrode layer may include a first internal electrode and first step compensation portions disposed to be spaced apart from both ends of the first internal electrode in the third direction, the third surface, and the fourth surface. The second internal electrode layer may include a second internal electrode and second step compensation portions disposed to be spaced apart from both ends of the second internal electrode in the third direction, the third surface, and the fourth surface. The first and second step compensation portions may be disposed to be in contact with at least one of the fifth surface and the sixth surface.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
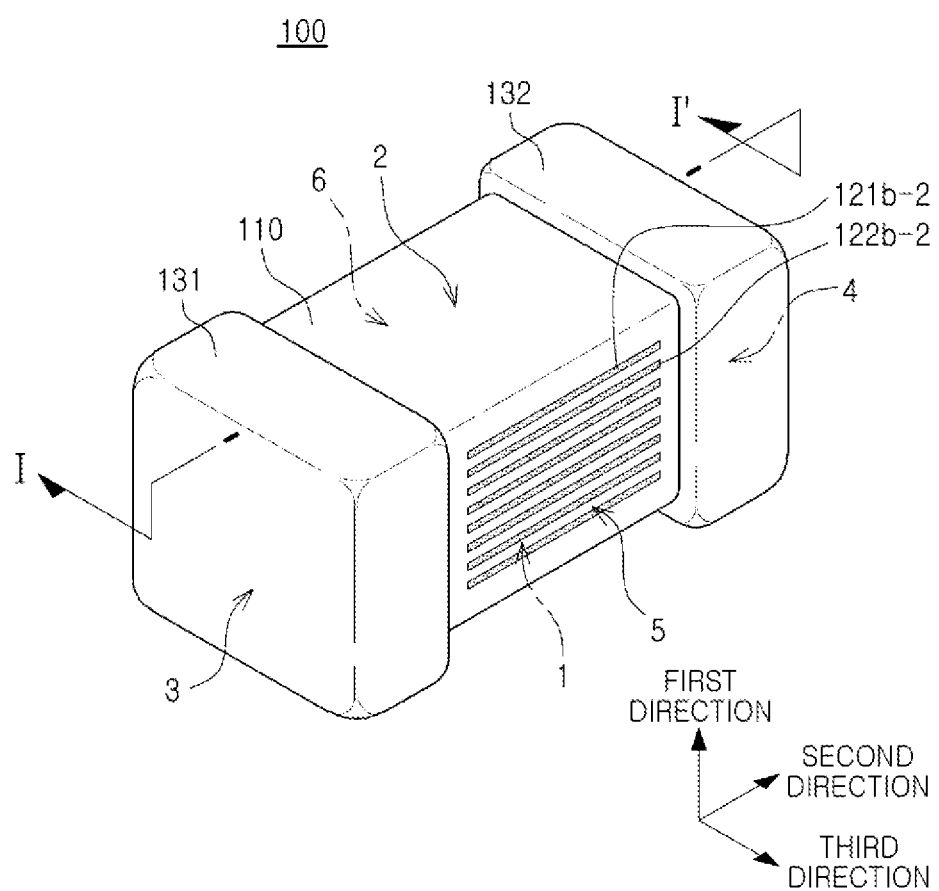
FIG. 1 is a schematic perspective view illustrating a multilayer electronic component according to an exemplary embodiment in the present disclosure.

FIG. 1 is a schematic perspective view illustrating a multilayer electronic component 100 according to an exemplary embodiment in the present disclosure.

Figure 2:
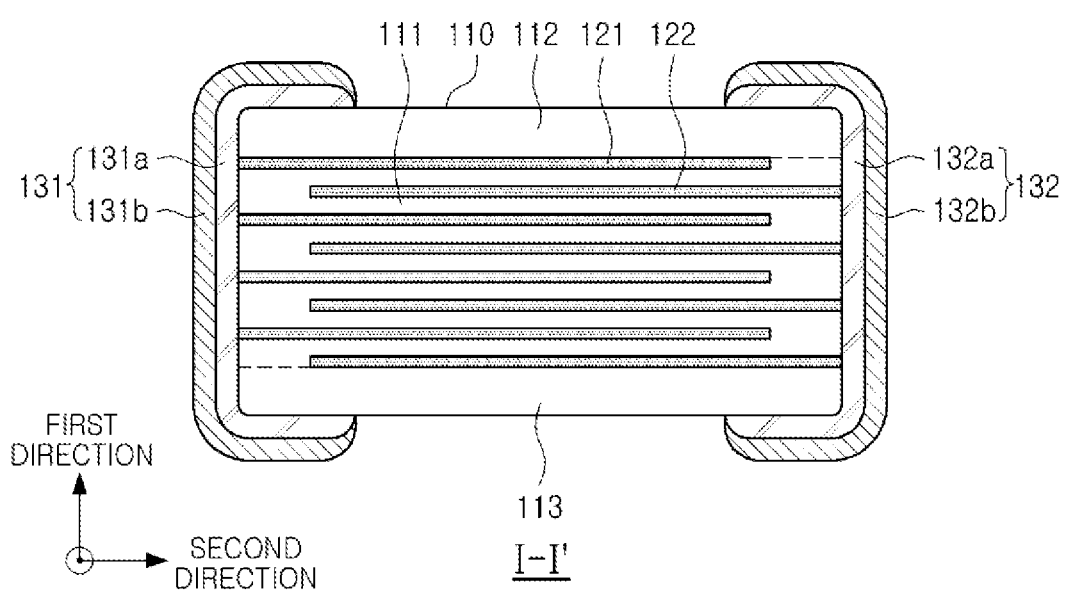
FIG. 2 is a cross-sectional view taken along line I-I' of FIG. 1.

FIG. 2 is a cross-sectional view taken along line I-I' of FIG. 1.

Figure 3:
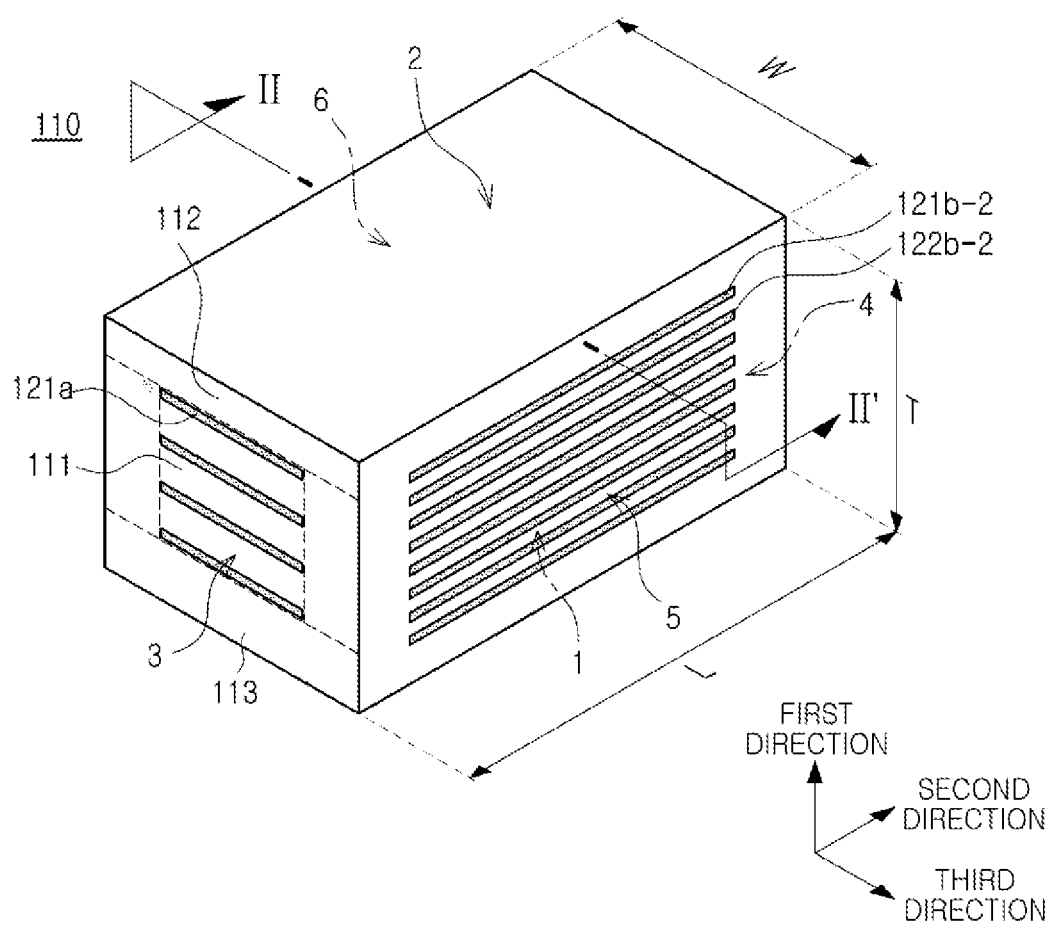
FIG. 3 is a perspective view illustrating a body of the multilayer electronic component according to an exemplary embodiment in the present disclosure.

FIG. 3 is a perspective view illustrating a body 110 of the multilayer electronic component 100 according to an exemplary embodiment in the present disclosure.

Referring to FIGS. 1 through 3, a multilayer electronic component 100 according to an exemplary embodiment in the present disclosure may include a body 110 including dielectric layers 111 and a plurality of first and second internal electrode layers 121 and 122 disposed to face each other with each of the dielectric layers 111 interposed therebetween and having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces and opposing each other in a third direction; a first external electrode 131 disposed on the third surface 3 and connected to the first internal electrode layers 121; and a second external electrode 132 disposed on the fourth surface 4 and connected to the second internal electrode layers 122.

In the multilayer electronic component according to an exemplary embodiment in the present disclosure, a 'length direction' refers to the second direction of FIG. 1, a 'width direction' refers to the third direction of FIG. 1, and a 'thickness direction' refers to the first direction of FIG. 1. Here, the 'thickness direction' refers to a direction in which the dielectric layers are stacked, that is, a 'stacking direction'.

Meanwhile, T, L, and W illustrated in the drawings may refer to a length T of the body in the first direction, a length L of the body in the second direction, and a length W of the body in the third direction, respectively.

In an exemplary embodiment in the present disclosure, a shape of the body 110 is not particularly limited, and may be a hexahedral shape as illustrated in FIGS. 1 through 3.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first to fourth surfaces and opposing each other in the third direction.

The first and second surfaces 1 and 2 refer to surfaces of the body 110 opposing each other in the thickness direction, the first direction, the third and fourth surfaces 3 and 4 refer to surfaces of the body 110 opposing each other in the length direction, the second direction, and the fifth and sixth surfaces 5 and 6 refer to surfaces of the body 110 opposing each other in the width direction, the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as a sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

A material of the dielectric layer 111 may include various ceramic additives, organic solvents, binders, dispersants, and the like, added to powders such as barium titanate ($BaTiO_3$) powders, or the like, according to an object of the present disclosure.

Meanwhile, a thickness td of the dielectric layer 111 does not need to be particularly limited. However, generally, when the thickness td of the dielectric layer 111 is 1.5 μm or more, a step portion between the dielectric layer 111 and an internal electrode layer may be further increased, such that reliability of the multilayer electronic component may be deteriorated.

According to an exemplary embodiment in the present disclosure, even when the thickness td of the dielectric layer 111 is 1.5 μm or more, the occurrence of delamination may be suppressed, and excellent moisture resistance reliability may be secured.

Accordingly, when the thickness of the dielectric layer 111 is 1.5 μm or less, a reliability improving effect and a delamination occurrence suppressing effect according to the present disclosure may become more remarkable.

The thickness td of the dielectric layer 111 may refer to an average thickness of the dielectric layer 111 disposed between the first and second internal electrode layers 121 and 122.

The average thickness of the dielectric layer 111 may be measured from an image obtained by scanning a cross section of the body 110 in the length and thickness directions (L-T) with an optical microscope or a scanning electron microscope (SEM). More specifically, an average value may be measured by measuring thicknesses of one dielectric layer at 30 points positioned at equal intervals in the length direction in the obtained image. The 30 points positioned at equal intervals may be designated in regions including margin portions as well as a capacitance forming part Ac. In addition, when an average thickness of ten dielectric layers is measured, the average thickness of the dielectric layers may further be generalized. Other methods and/or tools appreciated by one of ordinary skill in the art, even if not described in the present disclosure, may also be used.

The plurality of first and second internal electrode layers 121 and 122 formed in the body 110 may include first and second internal electrodes 121a and 122a, respectively.

One ends of the first and second internal electrodes 121a and 122a may be exposed through the third surface 3 or the fourth surface 4 of the body 110.

The internal electrodes 121a and 122a may be a pair of first internal electrode 121a and second internal electrode 122a having different polarities.

One ends of the first internal electrodes 121a may be exposed to (or be in contact with or extend from) the third surface 3, and one ends of the second internal electrodes 122a may be exposed to (or be in contact with or extend from) the fourth surface 4.

The other ends of the first internal electrodes 121a and the second internal electrodes 122a may be formed with predetermined intervals from the fourth surface 4 and the third surface 3, respectively.

The first and second external electrodes 131 and 132 may be formed on the third and fourth surfaces 3 and 4 of the body 110, respectively, and may be electrically connected to the internal electrode layers 121 and 122, respectively.

Accordingly, the first and second external electrodes 131 and 132 may be electrically connected to the first and second internal electrode layers 121 and 122 through the first and second internal electrodes 121a and 122a, respectively.

That is, the first external electrode 131 may be disposed on the third surface 3 of the body 110 and be connected to the first internal electrode layers 121, and the second external electrode 132 may be disposed on the fourth surface 4 of the body 110 and be connected to the second internal electrode layers 122.

The internal electrode layers 121 and 122 may be disposed alternately with the dielectric layers 111.

The internal electrode layers 121 and 122 may include first and second internal electrode layers 121 and 122. The first and second internal electrode layers 121 and 122 may be alternately disposed to face each other with each of the dielectric layers 111 constituting the body 110 interposed therebetween, and may be in contact with the first and second external electrodes on the third and fourth surfaces 3 and 4 of the body 110, respectively.

Referring to FIGS. 1 and 2, the first internal electrode layers 121 may be spaced apart from the fourth surface 4 and be in contact with the first external electrode on the third surface 3, and the second internal electrode layers 122 may be spaced apart from the third surface 3 and be in contact with the second external electrode on the fourth surface 4.

Accordingly, the first internal electrode layers 121 may be spaced apart from the second external electrode 131 and the second internal electrode layers 122 may be spaced apart from the first external electrode 131, and capacitance may thus be formed.

In this case, the first and second internal electrode layers 121 and 122 may be electrically separated from each other by each of the dielectric layers 111 disposed therebetween.

Figure 7:
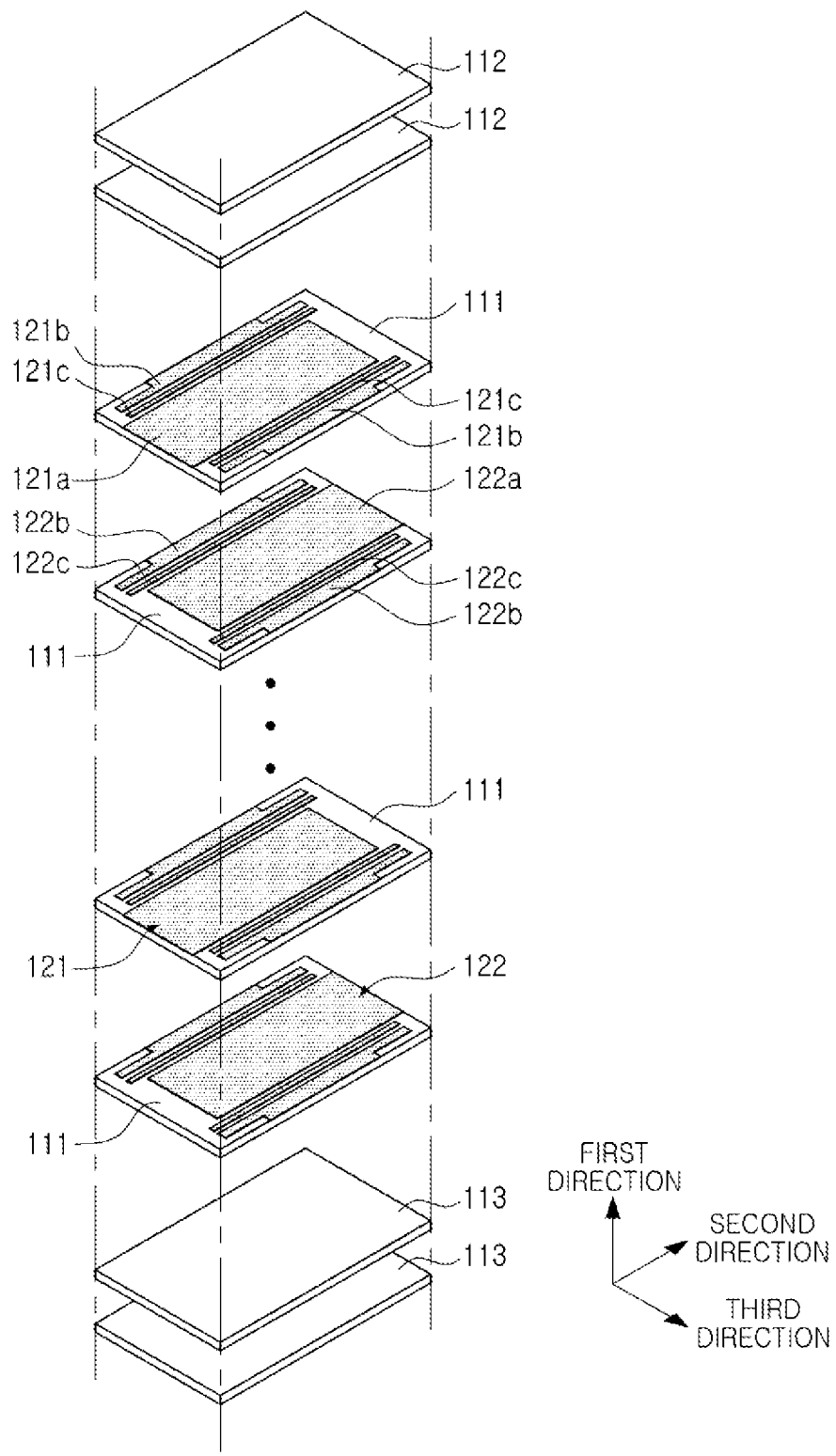
FIG. 7 is a schematic exploded perspective view illustrating the body of FIG. 3.

FIG. 7 is a schematic exploded perspective view illustrating the body 110 of FIG. 3.

Referring to FIG. 7, the body 110 may be formed by alternately stacking ceramic green sheets on which the first internal electrode layer 121 is printed and ceramic green sheets on which the second internal electrode layer 122 is printed and then sintering the stacked ceramic green sheets.

The conductive metal included in each of the internal electrode layers 121 and 122 may be one or more of nickel (Ni), copper (Cu), palladium (Pd), silver (Ag), gold (Au), platinum (Pt), tin (Sn), tungsten (W), titanium (Ti), and alloys thereof, and the present disclosure is not limited thereto.

In addition, the internal electrode layers 121 and 122 may include internal electrodes formed by printing a conductive paste on the ceramic green sheets, and a method of printing the conductive paste for an internal electrode may be a screen printing method, a gravure printing method or the like, but the present disclosure is not limited thereto.

In the related art, there was an attempt to stack a large number of internal electrodes and dielectric layers having a great thickness in order to secure high reliability. In this case, in a process of increasing a stack degree by stacking the internal electrodes and the dielectric layers, a phenomenon in which a step portion between the internal electrodes and the dielectric layers is increased may occur.

When the internal electrodes and the dielectric layers are stacked and a compression process is performed on the stacked internal electrodes and dielectric layers, cover portions of the dielectric layers may be pulled in a direction in which the internal electrodes are stacked, and a phenomenon in which surfaces on which the internal electrodes and margin portions are in contact with each other are widened may thus occur.

Thereafter, when the stacked dielectric layers and internal electrodes are sintered, the already pulled cover portions may be pulled more severely, an occurrence frequency and a size of delamination on the surfaces on which the internal electrodes and the margin portions are in contact with each other may be further increased.

Such delamination may develop into cracks in a process of manufacturing or using the multilayer electronic component to increase a defective rate, and become a moisture penetration path to cause a decrease in moisture resistance reliability.

Figure 4:
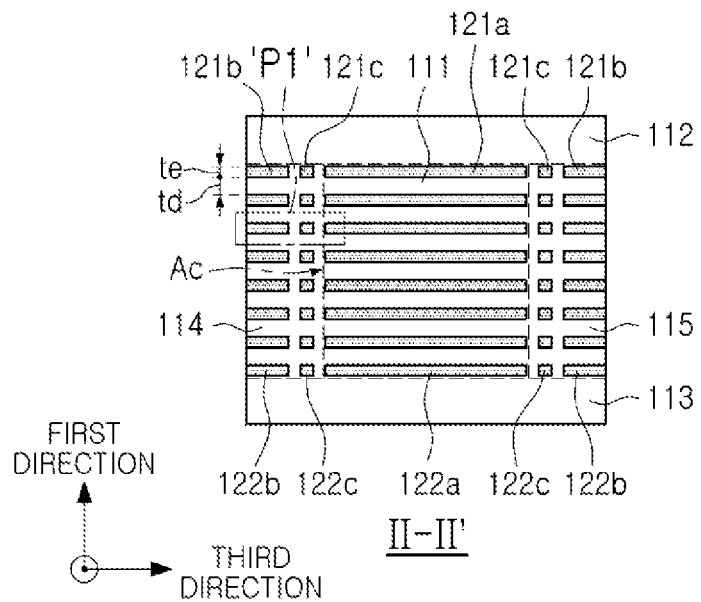
FIG. 4 is a cross-sectional view taken along line II-II' of FIG. 3.
Figure 5:
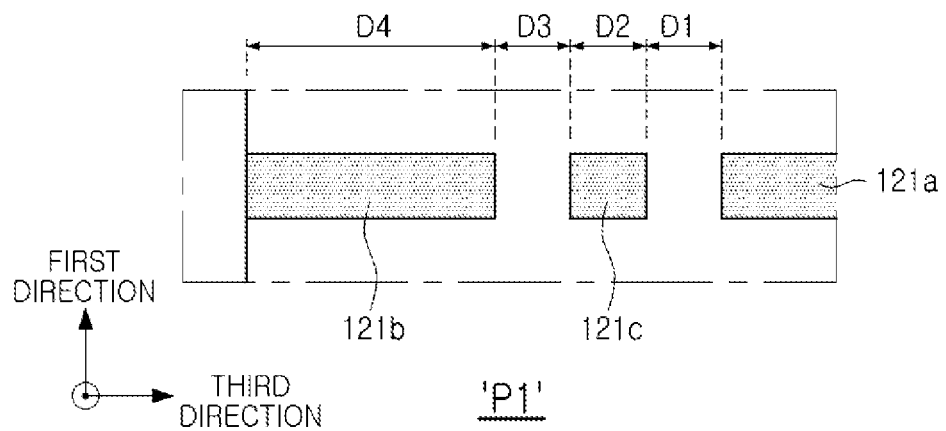
FIG. 5 is an enlarged view of region P1 of FIG. 4.

FIG. 4 is a cross-sectional view taken along line II-II' of FIG. 3, and FIG. 5 is an enlarged view of region P1 of FIG. 4.

Referring to FIGS. 4 and 5, the first internal electrode layer 121 of the multilayer electronic component 100 according to an exemplary embodiment in the present disclosure may include first step compensation portions 121b disposed to be spaced apart from both ends of the first internal electrode 121a in the third direction, the third surface, and the fourth surface and first intermediate electrodes 121c disposed between the first internal electrode 121a and the first step compensation portions 121b and disposed to be spaced apart from the third surface and the fourth surface. The second internal electrode layer 122 of the multilayer electronic component 100 may include second step compensation portions 122b disposed to be spaced apart from both ends of the second internal electrode 122a in the third direction, the third surface, and the fourth surface and second intermediate electrodes 122c disposed between the second internal electrode 122a and the second step compensation portions 122b and disposed to be spaced apart from the third surface and the fourth surface.

The step compensation portions 121b and 122b may be electrically insulated from the internal electrodes 121a and 122a because they are disposed to be spaced apart from the internal electrodes 121a and 122a, and may also be electrically insulated from the external electrodes 131 and 132 because they are spaced apart from the third and fourth surfaces.

Accordingly, the step compensation portions 121b and 122b do not contribute to forming the capacitance of the multilayer electronic component.

However, the step compensation portions may be disposed on the dielectric layers on which the internal electrodes 121a and 122a are not disposed, and may thus decrease a step portion due to the internal electrodes 121a and 122a to prevent delamination or cracks generated at interfaces between the internal electrodes and the margin portions.

Accordingly, deterioration of reliability of high-temperature acceleration and a moisture resistance load of the multilayer electronic component 100 may be prevented.

The internal electrodes 121a and 122a, the step compensation portions 121b and 122b, and the intermediate electrodes 121c and 122c each included in the internal electrode layers 121 and 122 may include conductive metals.

The conductive metals may be one or more of nickel (Ni), copper (Cu), palladium (Pd), silver (Ag), gold (Au), platinum (Pt), tin (Sn), tungsten (W), titanium (Ti), and alloys thereof, and the present disclosure is not limited thereto.

Meanwhile, the conductive metals included in the internal electrodes 121a and 122a, the step compensation portions 121b and 122b, and the intermediate electrodes 121c and 122c may have the same composition, but are not limited thereto, and may also have different compositions.

The step compensation portions 121b and 122b disposed to be spaced apart from both ends of the internal electrodes 121a and 122a in the third direction and the intermediate electrodes 121c and 122c disposed between the internal electrodes 121a and 122a and the step compensation portions 121b and 122b may be formed in the internal electrode layers 121 and 122, respectively, by additionally printing the intermediate electrodes 121c and 122c and the step compensation portions 121b and 122b at both ends of the internal electrodes 121a and 122b in the third direction in a process of printing the dielectric layers and then printing the internal electrodes 121a and 122b. That is, the internal electrodes 121a and 122b, the intermediate electrodes 121c and 122c, and the step compensation portions 121b and 122b may be simultaneously formed.

In the related art, there was an attempt to form margin portions 114 and 115 by applying a conductive paste onto the ceramic green sheets except for places where the margin portions are to be formed to form internal electrodes, and then stacking the internal electrodes, cutting a laminate so that the internal electrodes are exposed to the fifth and sixth surfaces 5 and 6 of the body, and then stacking a single dielectric layer or two or more dielectric layers on opposite side surfaces of the capacitance forming part Ac in the width direction in order to suppress a step portion due to the internal electrodes 121a and 122a.

However, in the multilayer electronic component 100 according to an exemplary embodiment, the first and second internal electrode layers 121 and 122 including the internal electrodes 121a and 122a, the step compensation portions 121b and 122b, and intermediate electrodes 121c and 122c may be formed by disposing copper plates on which a screen or a pattern is printed at places where the margin portions are to be formed on the ceramic green sheets, and then screen-printing or gravure-printing the conductive paste. Accordingly, the occurrence of delamination may be suppressed and the moisture resistance reliability may be improved, by forming the step compensation portions 121b and 122b and the intermediate electrodes 121c and 122c at the places where the margin portions are to be formed without performing additional cutting and printing processes.

FIG. 5 is an enlarged view of region P1 of FIG. 4.

Referring to FIG. 5, when D2/D4 is less 5% (0.05) in which D2 is a length of the first and second intermediate electrodes 121c and 122c in the third direction and D4 is a length of the first and second step compensation portions 121b and 122b in the third direction, it may be difficult to prevent propagation of cracks generated on a surface on which the margin part and the internal electrode are in contact with each other, such that moisture resistance reliability may be poor and it may be difficult to decrease an occurrence frequency of delamination.

In addition, when D2/D4 exceeds 40% (0.4), a contact area of the dielectric layer 111 may be small, such that moisture resistance reliability may not be improved and it may be difficult to decrease an occurrence frequency of delamination.

According to the multilayer electronic component according to an exemplary embodiment, $0.05 \leq D2/D4 \leq 0.4$, such that the moisture resistance reliability may be improved and the occurrence of the delamination may be decreased. More preferably $0.1 \leq D2/D4 \leq 0.3$, such that excellent moisture resistance reliability may be secured and the occurrence of the delamination may be suppressed.

Meanwhile, when D1 and D3 are less than 6 μm in which D1 is a length between the first internal electrode 121a and the first intermediate electrode 121c spaced apart from each other in the third direction and/or a length between the second internal electrode 122a and the second intermediate electrode 122c spaced apart from each other in the third direction and D3 is a length between the first intermediate electrode 121c and the first step compensation portion 121b spaced apart from each other in the third direction and/or a length between the second intermediate electrode 122c and the second step compensation portion 122b spaced apart from each other in the third direction, an interval between the internal electrode and the intermediate electrode and an interval between the intermediate electrode and the step portion compensation part may not be sufficient, such that moisture resistance reliability may be poor and an occurrence frequency of delamination may not be decreased.

In addition, when D1 and D3 exceed 20 μm, an adhesive force between the dielectric layers may not be sufficient, such that the occurrence of the delamination may not be decreased.

According to an exemplary embodiment, $10 \ \mu m \leq D1 \leq 20 \ \mu m$ and $10 \ \mu m \leq D3 \leq 20 \ \mu m$, and the interval between the internal electrode and the intermediate electrode and the interval between the intermediate electrode and the step portion compensation part may thus be sufficient, such that excellent moisture resistance reliability may be secured, and the intermediate electrode and the step portion compensation part may be sufficiently disposed in the margin part to suppress the occurrence of the delamination.

A thickness to of each of the first and second internal electrode layers 121 and 122 does not need to be particularly limited. However, when the thickness of the internal electrode layers 121 and 122 is 650 nm or more, a step portion between the internal electrode layer and the dielectric layer may be further increased, such that moisture resistance reliability may be decreased and an occurrence frequency of delamination may be increased.

According to an exemplary embodiment in the present disclosure, even when the thickness of each of the first and second internal electrode layers 121 and 122 is 650 nm or more, the occurrence of delamination may be suppressed and excellent moisture resistance reliability may be secured.

Accordingly, when the thickness of each of the first and second internal electrode layers 121 and 122 is 650 nm or more, a reliability improving effect and a delamination occurrence suppressing effect according to the present disclosure may become more remarkable.

The thickness to of each of the internal electrode layers 121 and 122 may refer to an average thickness.

The average thickness of each of the internal electrode layers 121 and 122 may be measured from an image obtained by scanning a cross section of the body 110 in the length and thickness directions with an optical microscope or a scanning electron microscope (SEM). More specifically, an average value may be measured by measuring thicknesses of one internal electrode layer at 30 points positioned at equal intervals in the length direction in the obtained image. The 30 points positioned at equal intervals may be designated in regions including margin portions as well as the capacitance forming part Ac. In addition, when an average thickness of ten internal electrode layers is measured, the average thickness of the internal electrode layer may be further generalized.

Figure 6A:
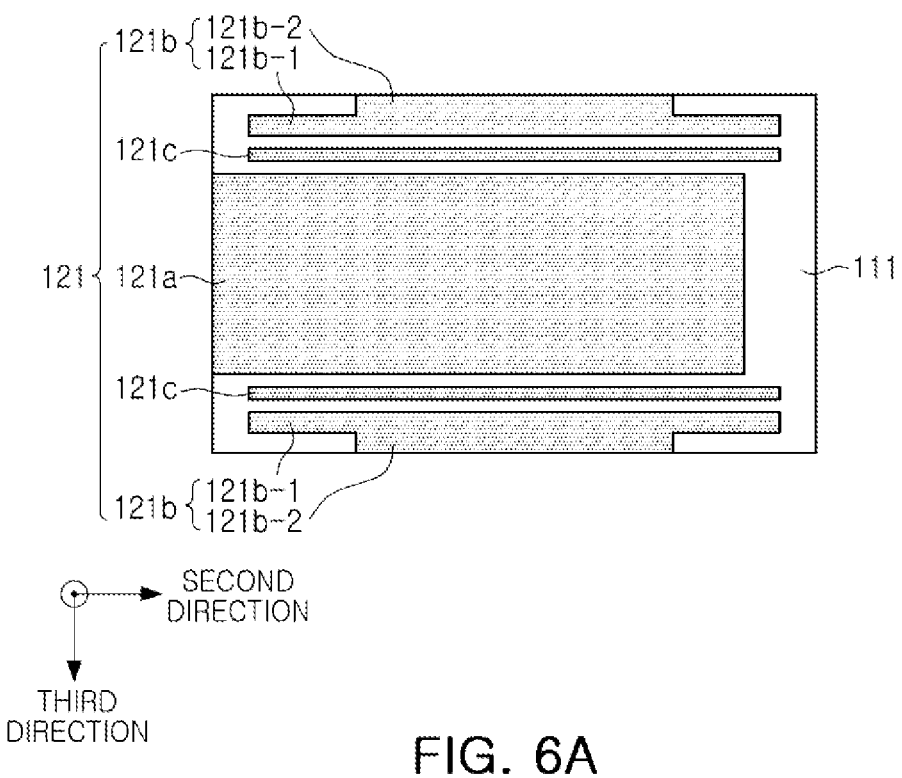
FIGS. 6A and 6B are, respectively, plan views illustrating a first internal electrode layer and a second internal electrode layer of the multilayer electronic component according to an exemplary embodiment in the present disclosure.
Figure 6B:
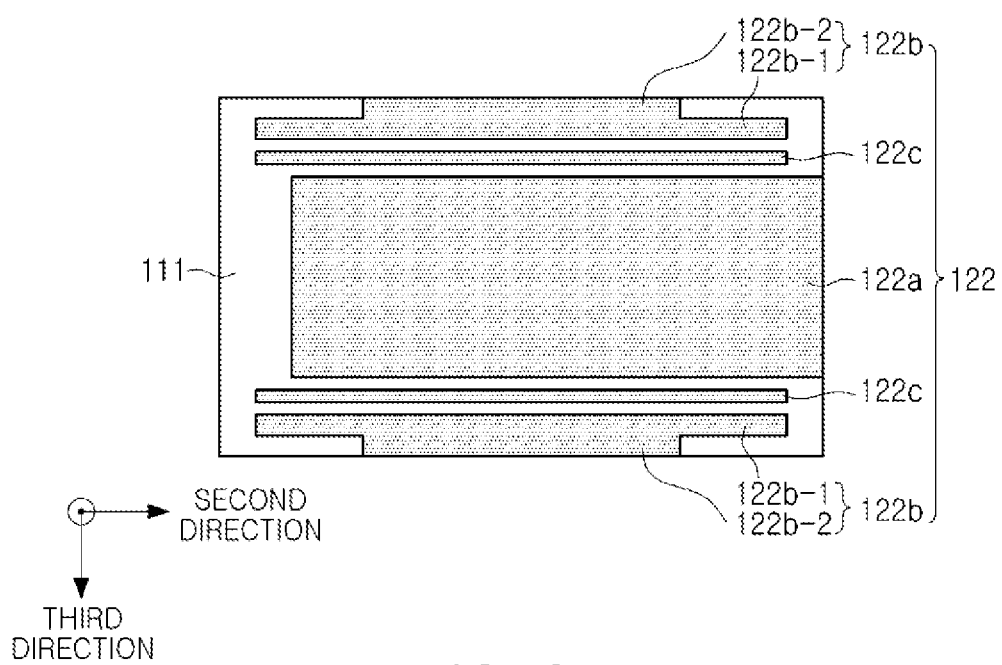

FIGS. 6A and 6B are, respectively, plan views illustrating a first internal electrode layer and a second internal electrode layer of the multilayer electronic component 100 according to an exemplary embodiment in the present disclosure.

Referring to FIGS. 6A and 6B, the first and second step compensation portions 121b and 122b of the multilayer electronic component according to an exemplary embodiment may be disposed to be in contact with at least one of the fifth surface 5 and the sixth surface 6. Specifically, the step compensation portions 121b and 122b may include body portions 121b-1 and 122b-1 disposed to be spaced apart from the fifth surface 5 and the sixth surface 6 and lead portions 121b-2 and 122b-2 extending from the body portions 121b-1 and 122b-1 and in contact with the fifth surface 5 or the sixth surface 6, respectively. Accordingly, moisture resistance reliability of the multilayer electronic component 100 may be improved by allowing the lead portions 121b-2 and 122b-2 to be oxidized before the body portions 121b-1 and 122b-1 are oxidized against external moisture.

Meanwhile, when the first and second external electrodes 131 and 132 are extended to and disposed on the fifth and sixth surfaces, the step compensation portions 121b and 122b and the external electrodes 131 and 132 may come into contact with each other, such that a short-circuit may occur.

In an exemplary embodiment, the lead portions 121b-2 and 122b-2 may be disposed to be spaced apart from the first and second external electrodes 131 and 132, and may thus prevent a phenomenon in which a short circuit occurs due to contact between the step compensation portions 121b and 122b and the external electrodes 131 and 132. Specifically, a distance by which the lead portions 121b-2 and 122b-2 are spaced apart from the third and fourth surfaces 3 and 4 may be greater than a distance by which the body portions 121b-1 and 122b-1 are spaced apart from the third and fourth surfaces.

In order to dispose the lead portions 121b-2 and 122b-2 so as to be spaced apart from the external electrodes 131 and 132, the body portions 121b-1 and 122b-1 may be disposed to be spaced apart from the third to sixth surfaces 3, 4, 5, and 6. In this case, a distance by which the body portions 121b-1 and 122b-1 are spaced apart from the third to sixth surfaces may be 10 μm or more, but is not limited thereto, and may be sufficient as long as it is a distance enough to compensate for a step portion while preventing a short-circuit with the external electrodes 131 and 132.

In an exemplary embodiment, a size of each of the lead portions 121b-2 and 122b-2 in the second direction may be smaller than a size of each of the body portions 121b-1 and 122b-1 in the second direction. Accordingly, a possibility that the short-circuit may occur due to the contact between the step compensation portions 121b and 122b and the external electrodes 131 and 132 extended to and disposed on the fifth and sixth surfaces may be further decreased.

In this case, a distance from one end of each of the body portions 121b-1 and 122b-1 in the second direction to one end of each of the lead portions 121b-2 and 122b-2 may be 20% to 25% of a size of the multilayer electronic component 100 in the second direction, but is not limited thereto, and may be sufficient as long as it is a distance enough to compensate for the step portion while preventing a short-circuit with the external electrodes 131 and 132.

Referring to FIG. 4, the body 110 may include a capacitance forming part Ac disposed in the body 110 and forming capacitance by including first internal electrodes 121a and second internal electrodes 122a disposed to face each other with each of the dielectric layers 111 interposed therebetween and cover portions 112 and 113 formed on opposite surfaces of the capacitance forming part Ac in the first direction, respectively.

In addition, the capacitance forming part Ac, which contributes to forming capacitance of a multilayer ceramic capacitor, may be formed by repeatedly stacking a plurality of first and second internal electrodes 121a and 122a with each of the dielectric layers 111 interposed therebetween.

The cover portions 112 and 113 may include an upper cover portion 112 disposed on one surface of the capacitance forming part Ac in the first direction and a lower cover portion 113 disposed on the other surface of the capacitance forming part Ac in the first direction.

The upper cover portion 112 and the lower cover portion 113 may be formed by stacking a single dielectric layer or two or more dielectric layers on upper and lower surfaces of the capacitance forming part Ac, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Referring to FIG. 4, margin portions 114 and 115 may be disposed on side surfaces of the capacitance forming part Ac.

The margin portions 114 and 115 may include a margin part 114 disposed on one surface of the capacitance forming part Ac in the third direction and a margin part 115 disposed on the other surface of the capacitance forming part Ac in the third direction. That is, the margin portions 114 and 115 may be disposed on opposite surfaces of the body 110 in the width direction (the third direction).

The margin portions 114 and 115 refer to regions between both distal ends of the first and second internal electrodes 121a and 122a and boundary surfaces of the body 110 in a cross section of the body 110 cut in the first and third directions (width-thickness direction), as illustrated in FIG. 4.

The margin portions 114 and 115 may basically serve to prevent damage to the internal electrodes due to physical or chemical stress.

Meanwhile, since the first and second internal electrode layers 121 and 122 include the step compensation portions 121b and 122b and the intermediate electrodes 121c and 122c, the step compensation portions 121b and 122b and the intermediate electrode 121c and 122c may be included in the margin portions 114 and 115.

The multilayer electronic component according to an exemplary embodiment in the present disclosure may include the first external electrode 131 connected to the first internal electrode layers 121 and the second external electrode 132 connected to the second internal electrode layers 122.

The first and second external electrodes 131 and 132 may be connected to the first and second internal electrode layers 121 and 122, respectively, in order to form capacitance, and the second external electrode 132 may be connected to a potential different to a potential to which the first external electrode 131 is connected.

The first and second external electrodes 131 and 132 may be disposed, respectively, on the third and fourth surfaces 3 and 4 of the body 110 in the length direction, which is the second direction, and may be extended to and disposed on the first and second surfaces 1 and 2 of the body 110 in the thickness direction, which is the first direction. The first and second external electrodes 131 and 132 may also be extended to and disposed on the fifth and sixth surfaces 5 and 6 of the body 110 in the width direction, which is the third direction.

The external electrodes 131 and 132 may include, respectively, first and second electrode layers 131a and 132a disposed on outer surfaces of the body 110 and connected to the internal electrode layers 121 and 122, respectively, and first and second conductive resin layers 131b and 132b disposed on the first and second electrode layers 131a and 132a, respectively.

Specifically, the first external electrode 131 may include the first electrode layer 131a disposed on the third surface 3 of the body 110 in the length direction, which is the second direction, and electrically connected to the first internal electrode layers 121 and the first conductive resin layer 131b disposed on the first electrode layer 131a.

In addition, the second external electrode 132 may include the second electrode layer 132a disposed on the fourth surface 4 of the body 110 in the length direction, which is the second direction, and electrically connected to the second internal electrode layers 122 and the second conductive resin layer 132b disposed on the second electrode layer 132a.

The first and second electrode layers 131a and 132a may include a conductive metal and glass.

The conductive metal used in the first and second electrode layers 131a and 132a is not particularly limited as long as it is a material that may be electrically connected to the internal electrodes in order to form the capacitance, and may be, for example, one or more selected from the group consisting of copper (Cu), silver (Ag), nickel (Ni), and alloys thereof.

The first and second electrode layers 131a and 132a may be formed by applying and then firing a conductive paste prepared by adding glass frit to conductive metal powders.

The first and second conductive resin layers 131b and 132b may be formed on the first and second electrode layers 131a and 132a, respectively, and may be formed to completely cover the first and second electrode layers 131a and 132a, respectively.

A base resin included in each of the first and conductive resin layers 131b and 132b is not particularly limited as long as it has a bonding property and a shock absorbing property and may be mixed with conductive metal powders to form a paste, and may include, for example, an epoxy-based resin.

A conductive metal included in each of the first and second conductive resin layers 131b and 132b is not particularly limited as long as it is a material that may be electrically connected to the first and second electrode layers 131a and 132a, and may include, for example, one or more selected from the group consisting of copper (Cu), silver (Ag), nickel (Ni), and alloys thereof.

The first and second electrode layers 131a and 132a and the first and second conductive resin layers 131b and 132b may be extended to and disposed on the first surface 1 and the second surface 2 of the body 110.

A multilayer electronic component 200 according to another exemplary embodiment in the present disclosure will hereinafter be described in detail, but a description overlapping the description of the multilayer electronic component according to an exemplary embodiment in the present disclosure will be omitted.

Figure 8:
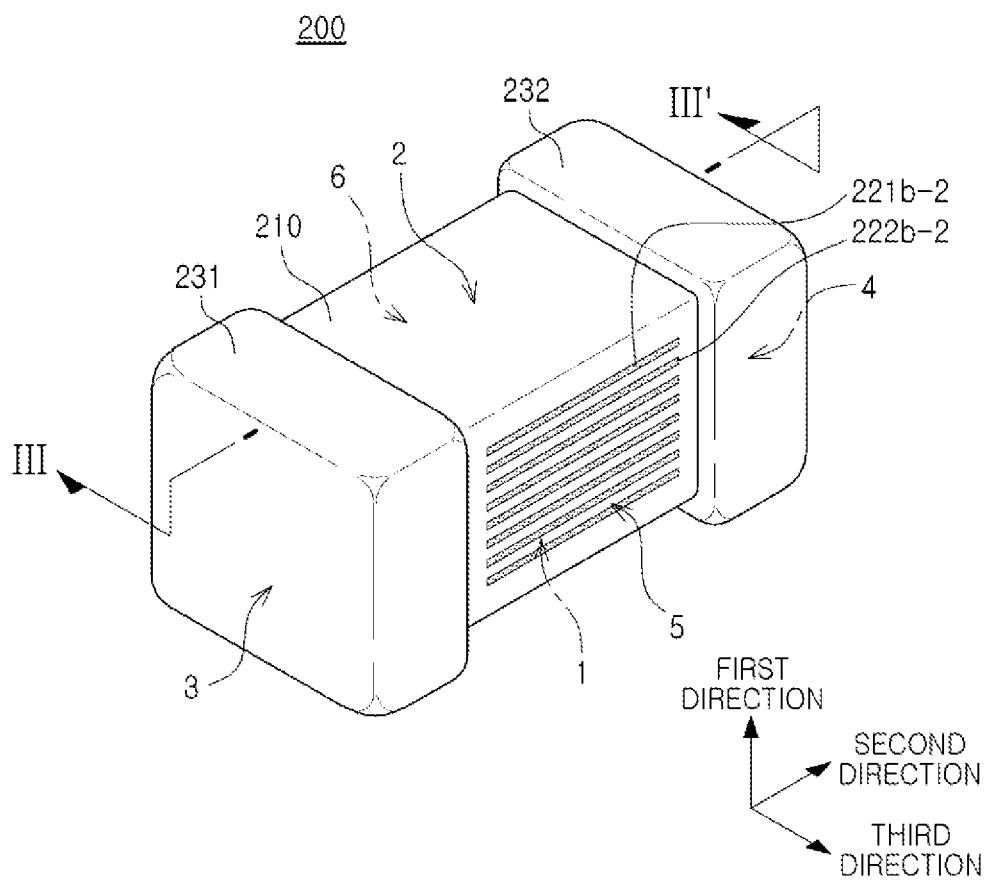
FIG. 8 is a schematic perspective view illustrating a multilayer electronic component according to another exemplary embodiment in the present disclosure.

FIG. 8 is a schematic perspective view illustrating a multilayer electronic component 200 according to another exemplary embodiment in the present disclosure.

Figure 9:
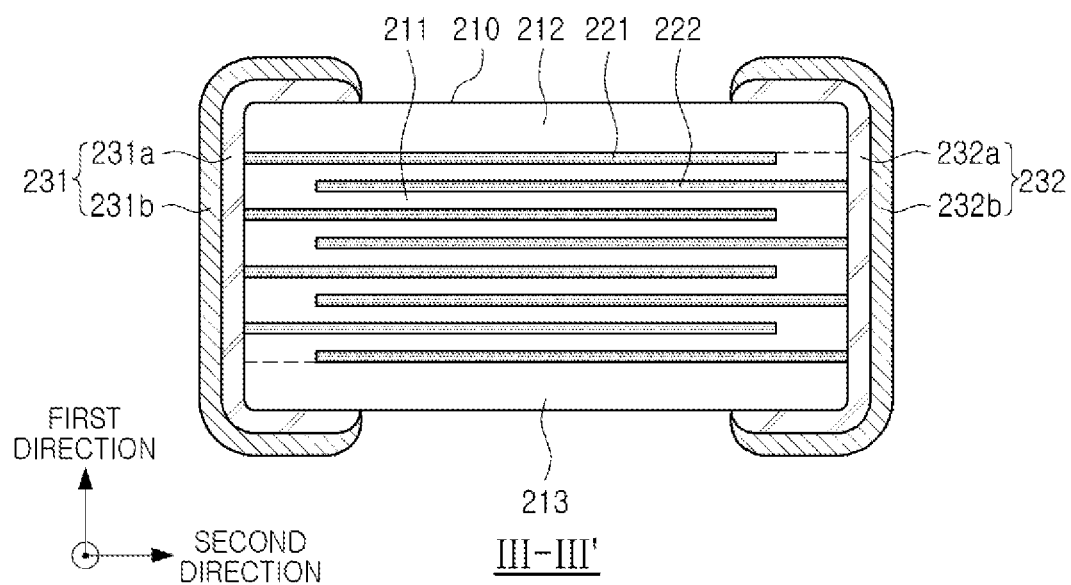
FIG. 9 is a cross-sectional view taken along line III-III' of FIG. 8.

FIG. 9 is a cross-sectional view taken along line III-III' of FIG. 8.

Figure 10:
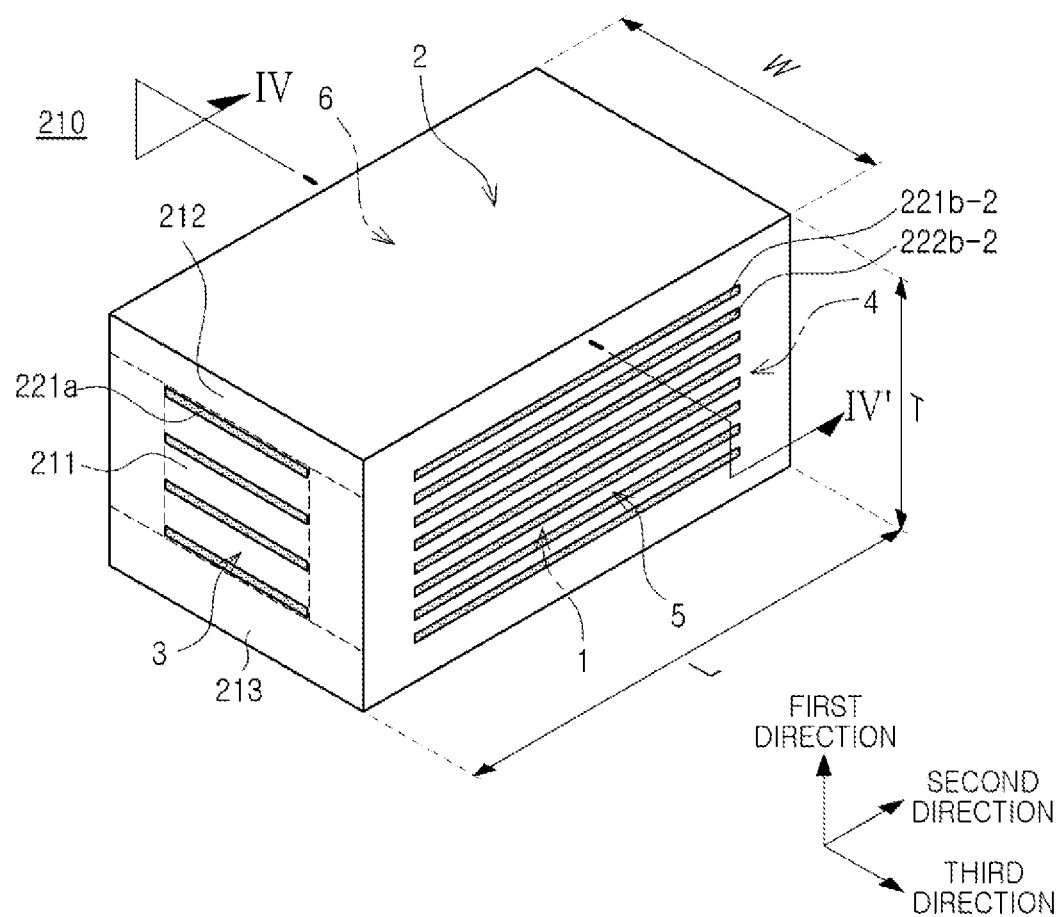
FIG. 10 is a perspective view illustrating a body of the multilayer electronic component according to another exemplary embodiment in the present disclosure.

FIG. 10 is a perspective view illustrating a body 210 of the multilayer electronic component 200 according to another exemplary embodiment in the present disclosure.

A multilayer electronic component 200 according to another exemplary embodiment in the present disclosure may include a body 210 including dielectric layers 211 and first and second internal electrode layers 221 and 222 alternately disposed with each of the dielectric layers 211 interposed therebetween and having first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 231 disposed on the third surface 3 and connected to the first internal electrode layers 221; and a second external electrode 232 disposed on the fourth surface 4 and connected to the second internal electrode layers 222. The first internal electrode layer 221 may include a first internal electrode 221a and first step compensation portions 221b disposed to be spaced apart from both ends of the first internal electrode 221a in the third direction, the third surface, and the fourth surface, the second internal electrode layer 222 may include a second internal electrode 222a and second step compensation portions 222b disposed to be spaced apart from both ends of the second internal electrode 222a in the third direction, the third surface, and the fourth surface, and the first and second step compensation portions 221b and 222b may be disposed to be in contact with at least one of the fifth surface 5 and the sixth surface 6.

Referring to FIGS. 8 through 10, a multilayer electronic component 200 according to another exemplary embodiment in the present disclosure may include a body 210 including dielectric layers 211 and a plurality of first and second internal electrode layers 221 and 222 disposed to face each other with each of the dielectric layers 211 interposed therebetween and having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces and opposing each other in a third direction; a first external electrode 231 disposed on the third surface 3 and connected to the first internal electrode layers 221; and a second external electrode 232 disposed on the fourth surface 4 and connected to the second internal electrode layers 222.

Figure 11:
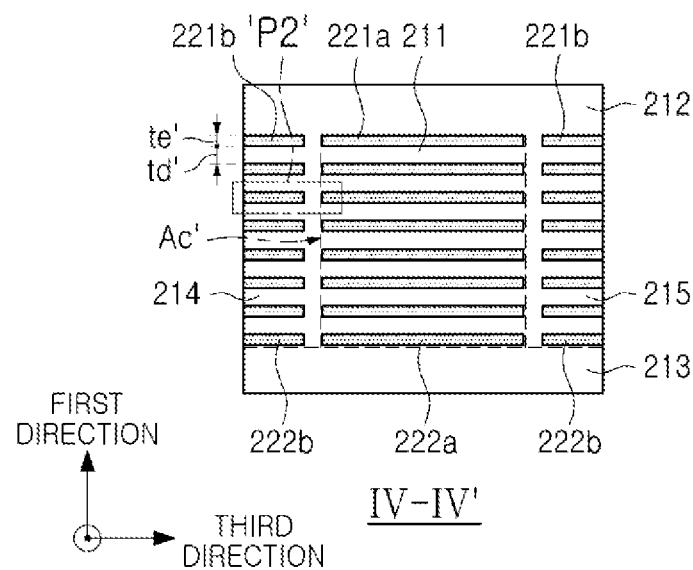
FIG. 11 is a cross-sectional view taken along line IV-IV' of FIG. 10.

Referring to FIG. 11, the body 210 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first to fourth surfaces and opposing each other in the third direction.

The first and second surfaces 1 and 2 refer to surfaces of the body 210 opposing each other in the thickness direction, which is the first direction, the third and fourth surfaces 3 and 4 refer to surfaces of the body 210 opposing each other in the length direction, which is the second direction, and the fifth and sixth surfaces 5 and 6 refer to surfaces of the body 210 opposing each other in the width direction, which is the third direction.

A plurality of dielectric layers 211 forming the body 210 may be in a sintered state, and adjacent dielectric layers 211 may be integrated with each other so that boundaries therebetween are not readily apparent without using a scanning electron microscope (SEM).

A raw material of the dielectric layer 211 is not particularly limited as long as a sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$.

A material of the dielectric layer 211 may include various ceramic additives, organic solvents, binders, dispersants, and the like, added to powders such as barium titanate ($BaTiO_3$) powders, or the like, according to an object of the present disclosure.

Meanwhile, a thickness td' of the dielectric layer 211 does not need to be particularly limited. However, when the thickness td' of the dielectric layer 211 is 1.5 μm or more, a step portion between the dielectric layer 111 and an internal electrode layer may be further increased, such that reliability of the multilayer electronic component may be deteriorated.

According to another exemplary embodiment in the present disclosure, even when the thickness td' of the dielectric layer 211 is 1.5 μm or more, the occurrence of delamination may be suppressed, and excellent moisture resistance reliability may be secured.

Accordingly, when the thickness of the dielectric layer 211 is 1.5 μm or less, a reliability improving effect and a delamination occurrence suppressing effect according to the present disclosure may become more remarkable.

The thickness td' of the dielectric layer 211 may refer to an average thickness of the dielectric layer 211 disposed between the first and second internal electrode layers 221 and 222.

The average thickness of the dielectric layer 211 may be measured from an image obtained by scanning a cross section of the body 210 in the length and thickness directions (L-T) with an optical microscope or a scanning electron microscope (SEM). More specifically, an average value may be measured by measuring thicknesses of one dielectric layer at 30 points positioned at equal intervals in the length direction in the obtained image. The 30 points positioned at equal intervals may be designated in regions including margin portions as well as a capacitance forming part Ac'. In addition, when an average thickness of ten dielectric layers is measured, the average thickness of the dielectric layers may further be generalized.

The plurality of first and second internal electrode layers 221 and 222 formed in the body 210 may include first and second internal electrodes 221a and 222a, respectively.

One ends of the first and second internal electrodes 221a and 222a may be exposed through the third surface 3 or the fourth surface 4 of the body 210.

The internal electrodes 221a and 222a may be a pair of a first internal electrode 221a and a second internal electrode 222a having different polarities.

One ends of the first internal electrodes 221a may be exposed to (or be in contact with or extend from) the third surface 3, and one ends of the second internal electrodes 222a may be exposed to (or be in contact with or extend from) the fourth surface 4.

The other ends of the first internal electrodes 221a and the second internal electrodes 222a may be formed with predetermined intervals from the fourth surface 4 and the third surface 3, respectively.

The first and second external electrodes 231 and 232 may be formed on the third and fourth surfaces 3 and 4 of the body 210, respectively, and may be electrically connected to the internal electrode layers 221 and 222, respectively.

Accordingly, the first and second external electrodes 231 and 232 may be electrically connected to the first and second internal electrode layers 221 and 222 through the first and second internal electrodes 221a and 222a, respectively.

That is, the first external electrode 231 may be disposed on the third surface 3 of the body and be connected to the first internal electrode layers 221, and the second external electrode 232 may be disposed on the fourth surface 4 of the body and connected to the second internal electrode layers 222.

The internal electrode layers 221 and 222 may be disposed alternately with the dielectric layers 211.

The internal electrode layers 221 and 222 may include first and second internal electrode layers 221 and 222. The first and second internal electrode layers 221 and 222 may be alternately disposed to face each other with each of the dielectric layers 211 constituting the body 210 interposed therebetween, and may be in contact with the first and second external electrodes on the third and fourth surfaces 3 and 4 of the body 210, respectively.

Referring to FIGS. 8 and 9, the first internal electrode layers 221 may be spaced apart from the fourth surface 4 and be in contact with the first external electrode 231 on the third surface 3, and the second internal electrode layers 222 may be spaced apart from the third surface 3 and be in contact with the second external 232 electrode on the fourth surface 4.

Accordingly, the first internal electrode layers 221 may be spaced apart from the second external electrode 231 and the second internal electrode layers 222 may be spaced apart from the first external electrode 231, and capacitance may thus be formed.

In this case, the first and second internal electrode layers 221 and 222 may be electrically separated from each other by each of the dielectric layers 211 disposed therebetween.

Figure 14:
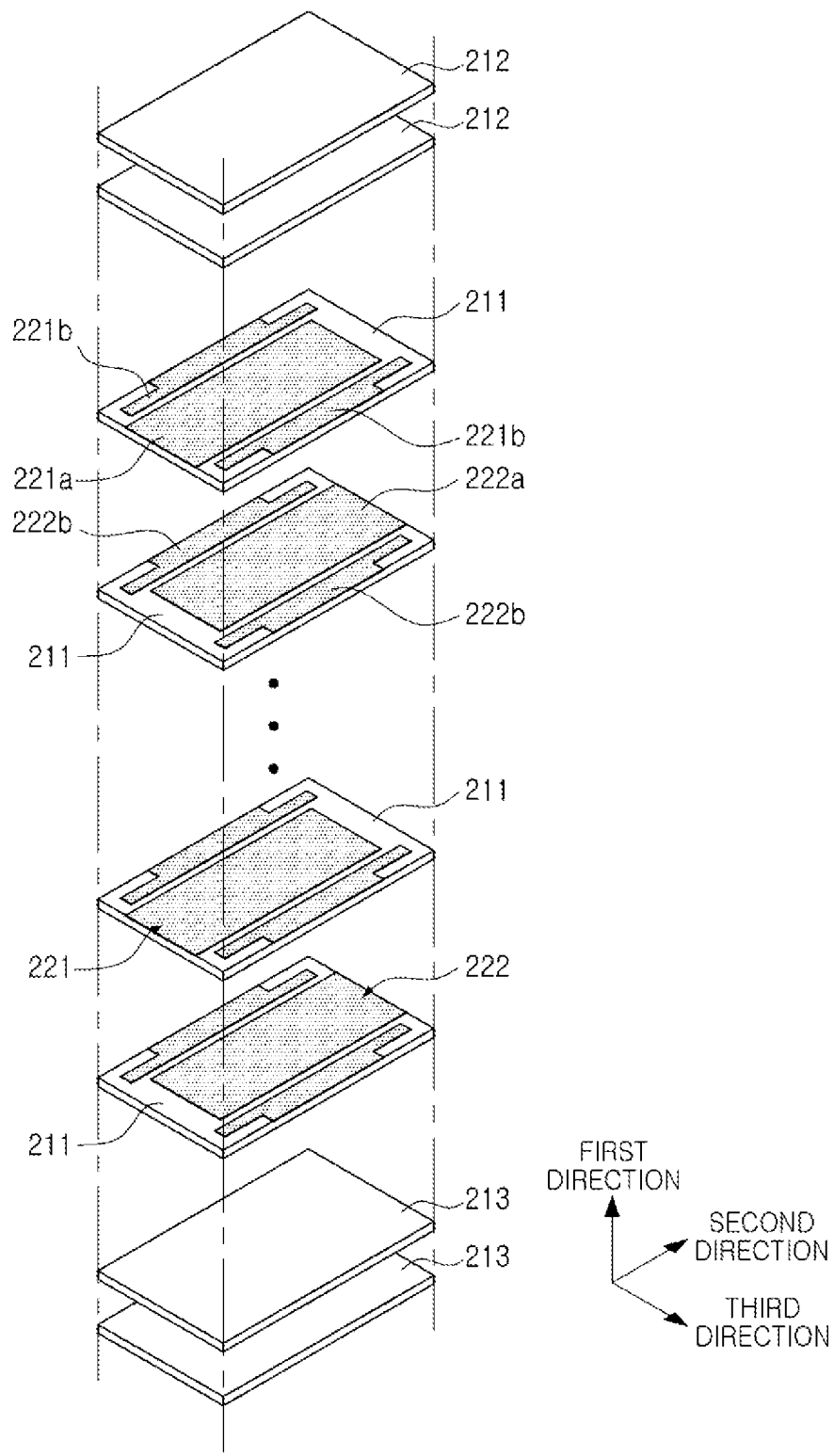
FIG. 14 is a schematic exploded perspective view illustrating the body of FIG. 10.

FIG. 14 is a schematic exploded perspective view illustrating the body 210 of FIG. 10.

Referring to FIG. 14, the body 210 may be formed by alternately stacking ceramic green sheets on which the first internal electrode layer 221 is printed and ceramic green sheets on which the second internal electrode layer 222 is printed and then sintering the stacked ceramic green sheets.

The conductive metal included in each of the internal electrode layers 221 and 222 may be one or more of nickel (Ni), copper (Cu), palladium (Pd), silver (Ag), gold (Au), platinum (Pt), tin (Sn), tungsten (W), titanium (Ti), and alloys thereof, and the present disclosure is not limited thereto.

In addition, the internal electrode layers 221 and 222 may include internal electrodes formed by printing a conductive paste on the ceramic green sheets, and a method of printing the conductive paste for an internal electrode may be a screen printing method, a gravure printing method or the like, but the present disclosure is not limited thereto.

Figure 12:
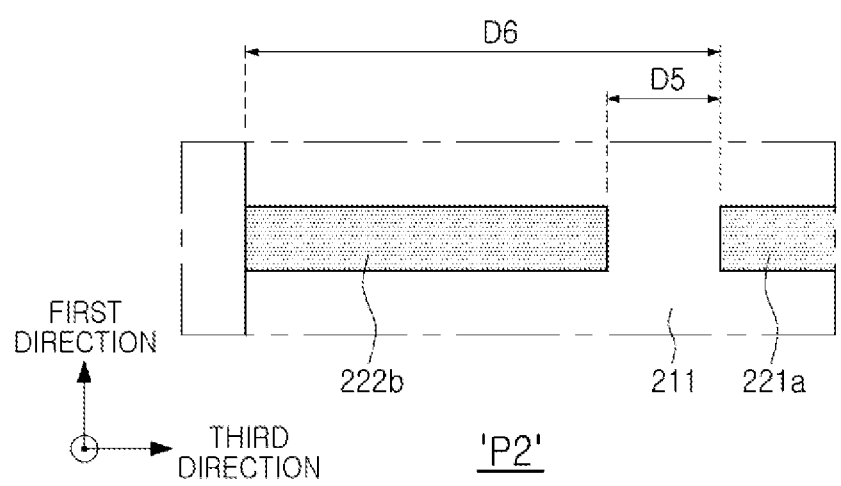
FIG. 12 is an enlarged view of region P2 of FIG. 11.

FIG. 11 is a cross-sectional view taken along line IV-IV' of FIG. 10, and FIG. 12 is an enlarged view of region P2 of FIG. 11.

Referring to FIGS. 11 and 12, the first internal electrode layer 221 of the multilayer electronic component 200 according to another exemplary embodiment in the present disclosure may include the first internal electrode 221a and the first step compensation portions 221b disposed to be spaced apart from both ends of the first internal electrode 221a in the third direction, the third surface, and the fourth surface, and the second internal electrode layer 222 of the multilayer electronic component 200 may include the second internal electrode 222a and the second step compensation portions 222b disposed to be spaced apart from both ends of the second internal electrode 222a in the third direction, the third surface, and the fourth surface.

Therefore, by disposing electrodes in margin portions, a warpage phenomenon of cover portions due to deformation caused by a step portion between stacking and compressing processes may be significantly suppressed, and a phenomenon in which surfaces on which the margin portions and the internal electrodes are in contact with each other are widened may be significantly suppressed.

The formation of delamination on the surfaces on which the margin portions and the internal electrodes are in contact with each other may be suppressed, such that reliability of the multilayer electronic component 200 may be improved.

The internal electrodes 221a and 222a and the step compensation portions 221b and 222b each included in the internal electrode layers 221 and 222 may include conductive metals.

The conductive metals may be one or more of nickel (Ni), copper (Cu), palladium (Pd), silver (Ag), gold (Au), platinum (Pt), tin (Sn), tungsten (W), titanium (Ti), and alloys thereof, and the present disclosure is not limited thereto.

Meanwhile, the conductive metals included in the internal electrodes 221a and 222a and the step compensation portions 221b and 222b may have the same composition, but are not limited thereto, and may also have different compositions.

In addition, the step compensation portions 221b and 222b may be formed by disposing copper plates on which a screen or a pattern is printed at places where the margin portions are to be formed on the ceramic green sheets, and then screen-printing or gravure-printing the conductive paste.

Accordingly, the first and second internal electrode layers 221 and 222 including the internal electrodes 221a and 222a and the step compensation portions 221b and 222b, respectively, may be formed.

Therefore, the occurrence of delamination may be suppressed and moisture resistance reliability may be improved, without performing additional cutting and printing processes.

In the related art, there was an attempt to stack a large number of internal electrodes and dielectric layers having a great thickness in order to secure high reliability. In this case, in a process of increasing a stack degree by stacking the internal electrodes and the dielectric layers, a phenomenon in which a step portion between the internal electrodes and the dielectric layers is increased may occur.

When the internal electrodes and the dielectric layers are stacked and a compression process is performed on the stacked internal electrodes and dielectric layers, cover portions of the dielectric layers may be pulled in a direction in which the internal electrodes are stacked, and a phenomenon in which surfaces on which the internal electrodes and margin portions are in contact with each other are widened may thus occur.

Thereafter, when the stacked dielectric layers and internal electrodes are sintered, the already pulled cover portions may be pulled more severely, an occurrence frequency and a size of delamination on the surfaces on which the internal electrodes and the margin portions are in contact with each other may be further increased.

Such delamination may develop into cracks in a process of manufacturing or using the multilayer electronic component to increase a defective rate, and become a moisture penetration path to cause a decrease in moisture resistance reliability.

In addition, referring to FIG. 11, the body 210 may include a capacitance forming part Ac' disposed in the body 210 and forming capacitance by including first internal electrodes 221a and second internal electrodes 222a disposed to face each other with each of the dielectric layers 211 interposed therebetween and cover portions 212 and 213 formed on opposite surfaces of the capacitance forming part Ac' in the first direction, respectively.

In addition, the capacitance forming part Ac', which contributes to forming capacitance of a multilayer ceramic capacitor, may be formed by repeatedly stacking a plurality of first and second internal electrodes 221a and 222a with each of the dielectric layers 211 interposed therebetween.

The cover portions 212 and 213 may include an upper cover portion 212 disposed on one surface of the capacitance forming part Ac' in the first direction and a lower cover portion 213 disposed on the other surface of the capacitance forming part Ac' in the first direction.

The upper cover portion 212 and the lower cover portion 213 may be formed by stacking a single dielectric layer or two or more dielectric layers on upper and lower surfaces of the capacitance forming part Ac', respectively, in the thickness direction, and may basically serve to prevent damage to the internal electrodes due to physical or chemical stress.

The upper cover portion 22 and the lower cover portion 213 may not include the internal electrodes, and may include the same material as the dielectric layer 211.

That is, the upper cover portion 212 and the lower cover portion 213 may include a ceramic material such as a barium titanate ($BaTiO_3$)-based ceramic material.

Margin portions 214 and 215 may be disposed on side surfaces of the capacitance forming part Ac'.

The margin portions 214 and 215 may include a margin part 214 disposed on one surface of the capacitance forming part Ac' in the third direction and a margin part 215 disposed on the other surface of the capacitance forming part Ac' in the third direction. That is, the margin portions 214 and 215 may be disposed on opposite surfaces of the body 210 in the width direction (the third direction).

The margin portions 214 and 215 refer to regions between both distal ends of the first and second internal electrodes 221a and 222a and boundary surfaces of the body 210 in a cross section of the body 210 cut in the first and third directions (width-thickness direction), as illustrated in FIG. 4.

The margin portions 214 and 215 may basically serve to prevent damage to the internal electrodes due to physical or chemical stress.

Meanwhile, since the first and second internal electrode layers 221 and 222 include the step compensation portions 221b and 222b, the step compensation portions 221b and 222b may be included in the margin portions 214 and 215.

A thickness te' of each of the first and second internal electrode layers 221 and 222 does not need to be particularly limited. However, when the thickness of the internal electrode layers 221 and 222 is 650 nm or more, a step portion between the internal electrode layer and the dielectric layer may be further increased, such that moisture resistance reliability may be decreased and an occurrence frequency of delamination may be increased.

According to another exemplary embodiment in the present disclosure, even when the thickness of each of the first and second internal electrode layers 221 and 222 is 650 nm or more, the occurrence of delamination may be suppressed and excellent moisture resistance reliability may be secure.

Accordingly, when the thickness of each of the first and second internal electrode layers 221 and 222 is 650 nm or more, a reliability improving effect and a delamination occurrence suppressing effect according to the present disclosure may become more remarkable.

The thickness te' of each of the internal electrode layers 221 and 222 may refer to an average thickness.

The average thickness of each of the internal electrode layers 221 and 222 may be measured from an image obtained by scanning a cross section of the body 210 in the length and thickness directions with an optical microscope or a scanning electron microscope (SEM). More specifically, an average value may be measured by measuring thicknesses of one internal electrode layer at 30 points positioned at equal intervals in the length direction in the obtained image. The 30 points positioned at equal intervals may be designated in regions including margin portions as well as the capacitance forming part Ac'. In addition, when an average thickness of ten internal electrode layers is measured, the average thickness of the internal electrode layer may be further generalized.

Referring to FIG. 12, when D5/D6 is less 5% (0.05) in which D5 is a distance between the first internal electrode 221a and the first step compensation portion 221b spaced apart from each other in the third direction and/or a distance between the second internal electrode 222a and the first step compensation portion 222b spaced apart from each other in the third direction and D6 is a length of the margin portion 214 in the third direction and/or a length of the margin portion 215 in the third direction, it may be difficult to prevent propagation of cracks generated on a surface on which the margin part and the internal electrode are in contact with each other, such that moisture resistance reliability may be poor and it may be difficult to decrease an occurrence frequency of delamination.

In addition, when D5/D6 exceeds 40% (0.4), a contact area of the dielectric layer 211 may be small, such that moisture resistance reliability may not be improved and it may be difficult to decrease an occurrence frequency of delamination.

In the multilayer electronic component according to another exemplary embodiment, $0.05 \leq D5/D6 \leq 0.4$, such that the moisture resistance reliability may be improved and the occurrence of the delamination may be decreased. More preferably $0.1 \leq D5/D6 \leq 0.3$, such that excellent moisture resistance reliability may be secured and the occurrence of the delamination may be suppressed.

Figure 13A:
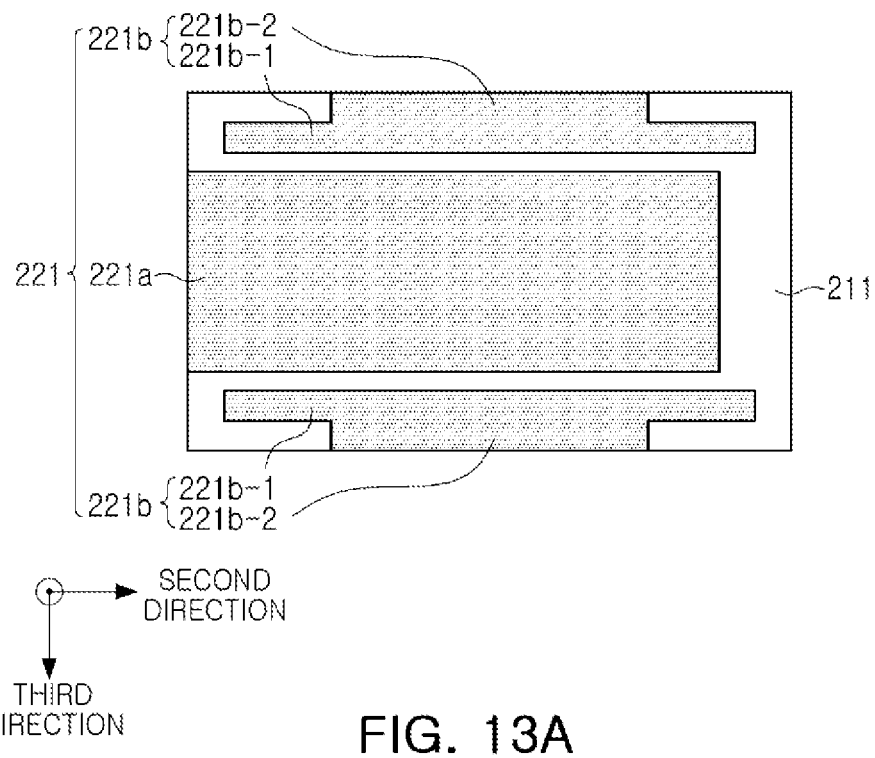
FIGS. 13A and 13B are, respectively, plan views illustrating a first internal electrode layer and a second internal electrode layer of the multilayer electronic component according to another exemplary embodiment in the present disclosure.
Figure 13B:
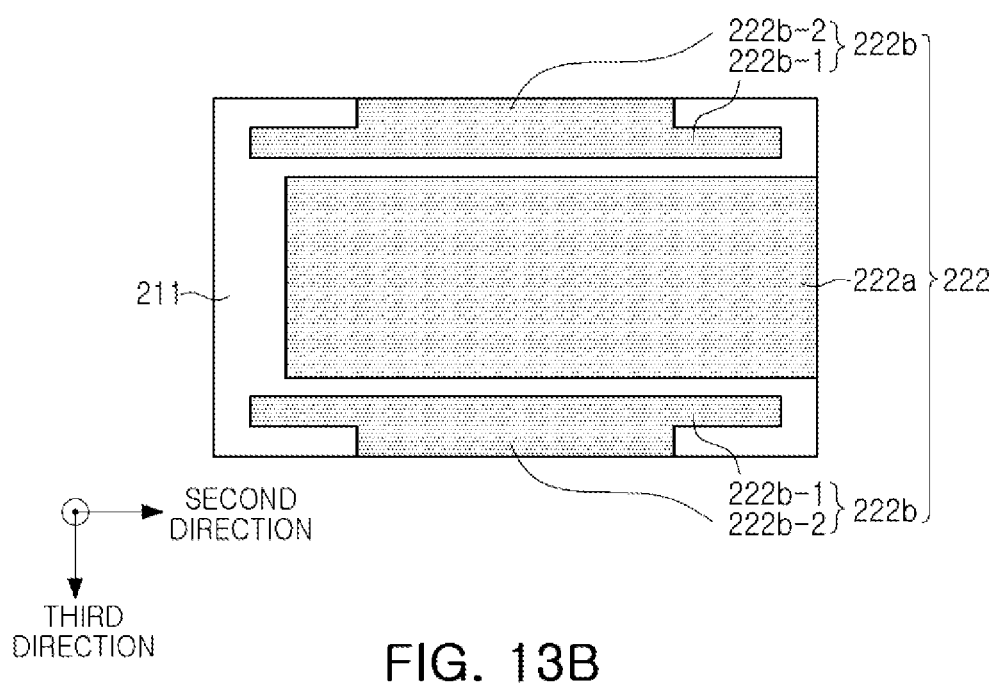

FIGS. 13A and 13B are, respectively, plan views illustrating a first internal electrode layer and a second internal electrode layer of the multilayer electronic component 200 according to another exemplary embodiment in the present disclosure.

Referring to FIGS. 13A and 13B, the first and second step compensation portions 221b and 222b of the multilayer electronic component 200 may be disposed to be in contact with at least one of the fifth surface 5 and the sixth surface 6. Specifically, the step compensation portions 221b and 222b may include body portions 221b-1 and 222b-1 disposed to be spaced apart from the fifth surface 5 and the sixth surface 6 and lead portions 221b-2 and 222b-2 extending from the body portions 221b-1 and 222b-1 and in contact with the fifth surface 5 or the sixth surface 6, respectively. Accordingly, moisture resistance reliability of the multilayer electronic component 200 may be improved by allowing the lead portions 221b-2 and 222b-2 to be oxidized before the body portions 221b-1 and 222b-1 are oxidized against external moisture.

Meanwhile, when the first and second external electrodes 231 and 232 are extended to and disposed on the fifth and sixth surfaces, the step compensation portions 221b and 222b and the external electrodes 231 and 232 may come into contact with each other, such that a short-circuit may occur.

In another exemplary embodiment, the lead portions 221b-2 and 222b-2 may be disposed to be spaced apart from the first and second external electrodes 231 and 232, and may thus prevent a phenomenon in which a short circuit occurs due to contact between the step compensation portions 221b and 222b and the external electrodes 231 and 232. Specifically, a distance by which the lead portions 221b-2 and 222b-2 are spaced apart from the third and fourth surfaces 3 and 4 may be greater than a distance by which the body portions 221b-1 and 222b-1 are spaced apart from the third and fourth surfaces.

In order to dispose the lead portions 221b-2 and 222b-2 so as to be spaced apart from the external electrodes 231 and 232, the body portions 221b-1 and 222b-1 may be disposed to be spaced apart from the third to sixth surfaces 3, 4, 5, and 6. In this case, a distance by which the body portions 221b-1 and 222b-1 are spaced apart from the third to sixth surfaces may be 10 μm or more, but is not limited thereto, and may be sufficient as long as it is a distance enough to compensate for a step portion while preventing a short-circuit with the external electrodes 231 and 232.

In another exemplary embodiment, a size of each of the lead portions 221b-2 and 222b-2 in the second direction may be smaller than a size of each of the body portions 221b-1 and 222b-1 in the second direction. Accordingly, a possibility that the short-circuit may occur due to the contact between the step compensation portions 221b and 222b and the external electrodes 231 and 232 extended to and disposed on the fifth and sixth surfaces may be further decreased.

In this case, a distance from one end of each of the body portions 221b-1 and 22b-1 in the second direction to one end of each of the lead portions 221b-2 and 222b-2 may be 20% to 25% of a size of the multilayer electronic component 200 in the second direction, but is not limited thereto, and may be sufficient as long as it is a distance enough to compensate for the step portion while preventing a short-circuit with the external electrodes 231 and 232.

According to another exemplary embodiment, the first internal electrode layer 221 may further include two or more intermediate electrodes between the first internal electrode 221a and the first step portion difference compensating parts 221b, and the second internal electrode layer 222 may further include two or more intermediate electrodes between the second internal electrode 222a and the second step portion difference compensating parts 222b, such that a step portion between the internal electrodes 221 and 222a and the margin portions 214 and 215 may be further decreased, and the moisture resistance reliability of the multilayer electronic component 200 may thus be further improved.

The external electrodes 231 and 232 may include, respectively, first and second electrode layers 231a and 232a disposed on outer surfaces of the body 210 and connected to the internal electrode layers 221 and 222, respectively, and first and second conductive resin layers 231b and 232b disposed on the first and second electrode layers 231a and 232a, respectively.

Specifically, the first external electrode 231 may include the first electrode layer 231a disposed on the third surface 3 of the body 210 in the length direction, which is the second direction, and connected to the first internal electrode layers 221 and the first conductive resin layer 231b disposed on the first electrode layer 231a.

In addition, the second external electrode 232 may include the second electrode layer 232a disposed on the fourth surface 4 of the body 210 in the length direction, which is the second direction, and connected to the second internal electrode layers 222 and the second conductive resin layer 232b disposed on the second electrode layer 232a.

The first and second electrode layers 231a and 232a may include a conductive metal and glass.

The conductive metal used in the first and second electrode layers 231a and 232a is not particularly limited as long as it is a material that may be electrically connected to the internal electrodes in order to form the capacitance, and may be, for example, one or more selected from the group consisting of copper (Cu), silver (Ag), nickel (Ni), and alloys thereof.

The first and second electrode layers 231a and 232a may be formed by applying and then firing a conductive paste prepared by adding glass frit to conductive metal powders.

The first and second conductive resin layers 231b and 232b may be formed on the first and second electrode layers 231a and 232a, respectively, and may be formed to completely cover the first and second electrode layers 231a and 232a, respectively.

A base resin included in each of the first and conductive resin layers 231b and 232b is not particularly limited as long as it has a bonding property and a shock absorbing property and may be mixed with conductive metal powders to form a paste, and may include, for example, an epoxy-based resin.

A conductive metal included in each of the first and second conductive resin layers 231b and 232b is not particularly limited as long as it is a material that may be electrically connected to the first and second electrode layers 231a and 232a, and may include, for example, one or more selected from the group consisting of copper (Cu), silver (Ag), nickel (Ni), and alloys thereof.

Inventive Example

In Tables 1 to 3, results obtained by evaluating moisture resistance reliability and delamination formation frequencies of samples while adjusting values of D1, D2, D3, D4, D5, and D6 were compared with each other and represented.

In a moisture resistance reliability test, among 400 samples with a rated voltage of 50 V, a sample of which insulation resistance decreased to $10^4 \Omega$ or less within 24 hours after a direct current (DC) voltage of 100 V was applied to the sample at a temperature of 85° C. and a relative humidity of 85% was decided as a defective product, a case where the number of defective products is 2 or less was evaluated as OK, and a case where the number of defective products is not 2 or less was evaluated as NG.

In a delamination formation frequency test, the number of samples in which delamination is formed at a boundary between a margin part and an internal electrode through an optical microscope after hundred multilayer electronic component samples were molded in width-thickness directions and then polished to ⅓ to ½ thereof in a length direction was measured, a case where delamination was found in 3% or less of the samples was decided as a defective product, a case where three or less defective products were generated was evaluated as OK, and a case where more than three defective products were generated was evaluated as NG.

Meanwhile, D1, D2, D3, D4, D5, and D6 may be measured from an image obtained by scanning a cross section, in the width-thickness directions, of the body in which the lead portion of the step portion compensation part is formed, with an optical microscope or a scanning electron microscope (SEM).

More specifically, when a length of the body is L and a thickness of the body is T, D1, D2, D3, D4, D5, and D6 may be average values measured in arbitrary five internal electrode layers selected in a region of T/2−0.1 T to T/2+0.1 T of the body in the thickness direction after polishing the body to a point of L/2−0.2 L to L/2+0.2 L of the body in the length direction.

TABLE 1

| Test No. | D1(μm) | D3(μm) | Moisture Resistance Reliability (Number of Defective Products/Number of Samples) | Delamination Formation Frequency (Number of Defective Products/Number of Samples) |
|---|---|---|---|---|
| 1* | 4 | 4 | NG(4/400) | NG(5/100) |
| 2 | 6 | 6 | OK(2/400) | OK(3/100) |
| 3 | 8 | 8 | OK(2/400) | OK(3/100) |
| 4 | 10 | 10 | GK(0/400) | OK(0/100) |
| 5 | 12 | 12 | GK(0/400) | GK(0/100) |
| 6 | 14 | 14 | GK(0/400) | GK(0/100) |
| 7 | 16 | 16 | GK(0/400) | GK(0/100) |
| 8 | 18 | 18 | GK(0/400) | GK(0/100) |

TABLE 1-continued

| Test No. | D1(μm) | D3(μm) | Moisture Resistance Reliability (Number of Defective Products/Number of Samples) | Delamination Formation Frequency (Number of Defective Products/ Number of Samples) |
|---|---|---|---|---|
| 9 | 20 | 20 | GK(0/400) | GK(0/100) |
| 10* | 22 | 22 | GK(0/400) | NG(5/100) |
| 11* | 24 | 24 | OK(0/400) | NG(5/100) |

*Comparative Example

It can be seen from Table 1 that in Test No. 1*, which is a case where D1 and D3 are 4 μm, an interval between an internal electrode and an intermediate electrode and an interval between the intermediate electrode and a step portion compensation part are not sufficient, such that moisture resistance reliability is poor and a delamination occurrence frequency may not be decreased.

It can be seen that in Test Nos. 2 and 3, which are cases where D1 and D3 are 6 μm and 8 μm, respectively, an interval between an internal electrode and an intermediate electrode and an interval between the intermediate electrode and a step portion compensation part are sufficient, such that moisture resistance reliability may be improved and the occurrence of delamination may be decreased.

It can been seen that in Test Nos. 4 to 9, which are cases where 10 μm≤D1≤20 μm and 10 μm≤D3≤20 μm, an interval between an internal electrode and an intermediate electrode and an interval between the intermediate electrode and a step portion compensation part are sufficient, such that excellent moisture resistance reliability may be secured, and the intermediate electrode and the step portion compensation part may be sufficiently disposed in a margin part to suppress the occurrence of delamination.

It can be seen that in Test Nos 10* and 11*, which are cases where D1 and D3 are 22 μm and 24 μm, respectively, an adhesive force between dielectric layers is not sufficient, such that the occurrence of delamination may not be decreased.

Accordingly, according to an exemplary embodiment, 6 μm≤D1≤20 μm and 6 μm≤D3≤20 μm, such that the moisture resistance reliability may be improved and the occurrence of the delamination may be decreased. More preferably, 10 μm≤D1≤20 μm and 10 μm≤D3≤20 μm, such that excellent moisture resistance reliability may be secured and the occurrence of the delamination may be suppressed.

TABLE 2

| Test No. | (D2/D4) | Moisture Resistance Reliability (Number of Defective Products/Number of Samples) | Delamination Formation Frequency (Number of Defective Products/ Number of Samples) |
|---|---|---|---|
| 1* | 0.01 | NG(4/400) | NG(5/100) |
| 2 | 0.05 | OK(2/400) | OK(3/100) |
| 3 | 0.1 | OK(0/400) | OK(0/100) |
| 4 | 0.15 | OK(0/400) | OK(0/100) |
| 5 | 0.20 | OK(0/400) | OK(0/100) |
| 6 | 0.25 | OK(0/400) | OK(0/100) |
| 7 | 0.30 | OK(0/400) | OK(0/100) |
| 8 | 0.35 | OK(2/400) | OK(3/100) |
| 9 | 0.40 | OK(2/400) | OK(3/100) |
| 10* | 0.45 | NG(4/400) | NG(5/100) |

*Comparative Example

It can be seen from Table 2 that in Test No. 1*, which is a case where D2/D4 is 0.01, moisture resistance reliability is poor and an occurrence frequency of delamination may not be decreased.

It can be seen that in Test No. 2, which is a case where D2/D4 is 0.05, moisture resistance reliability may be improved and the occurrence of delamination may be decreased.

It can be seen that in Test Nos. 3 to 7, which are cases where D2/D4 is 0.1 to 0.3, excellent moisture resistance reliability may be secured and the occurrence of delamination may be suppressed.

It can be seen that in Test Nos. 8 and 9, which are cases where D2/D4 is 0.35 and 0.40, respectively, moisture resistance reliability may be improved and the occurrence of delamination may also be suppressed.

It can be seen that in Test No. 10*, which is a case where D2/D4 is 0.45, moisture resistance reliability is not improved and the occurrence of delamination may not be suppressed.

Accordingly, according to an exemplary embodiment, 0.05≤D2/D4≤0.4, such that the moisture resistance reliability may be improved and the occurrence of the delamination may be decreased. More preferably, 0.1≤D2/D4≤0.3, such that excellent moisture resistance reliability may be secured and the occurrence of the delamination may be suppressed.

TABLE 3

| Test No. | (D5/D6) | Reliability (Number of Defective Products/Number of Samples) | Delamination Formation Frequency (Number of Defective Products/ Number of Samples) |
|---|---|---|---|
| 1* | 0.01 | NG(4/400) | NG(5/100) |
| 2 | 0.05 | OK(2/400) | OK(3/100) |
| 3 | 0.10 | GK(0/400) | GK(0/100) |
| 4 | 0.15 | GK(0/400) | OK(0/100) |
| 5 | 0.20 | GK(0/400) | OK(0/100) |
| 6 | 0.25 | GK(0/400) | OK(0/100) |
| 7 | 0.30 | GK(0/400) | GK(0/100) |
| 8 | 0.35 | OK(2/400) | OK(3/100) |
| 9 | 0.40 | OK(2/400) | OK(3/100) |
| 10* | 0.45 | NG(4/400) | NG(5/100) |

*Comparative Example

It can be seen from Table 3 that in Test No. 1*, which is a case where D5/D6 is 0.01, moisture resistance reliability is poor and an occurrence frequency of delamination may not be decreased.

It can be seen that in Test No. 2, which is a case where D5/D6 is 0.05, moisture resistance reliability may be improved and the occurrence of delamination may be decreased.

It can be seen that in Test Nos. 3 to 7, which are cases where D5/D6 is 0.1 to 0.3, excellent moisture resistance reliability may be secured and the occurrence of delamination may be suppressed.

It can be seen that in Test Nos. 8 and 9, which are cases where D5/D6 is 0.35 and 0.40, respectively, moisture resistance reliability may be improved and the occurrence of delamination may also be suppressed.

It can be seen that in Test No. 10*, which is a case where D5/D6 is 0.45, moisture resistance reliability is not improved and the occurrence of delamination may not be suppressed.

Accordingly, according to an exemplary embodiment, 0.05≤D5/D6≤0.4, such that the moisture resistance reliability may be improved and the occurrence of the delamination may be decreased. More preferably, 0.1≤D5/D6≤0.3, such that excellent moisture resistance reliability may be secured and the occurrence of the delamination may be suppressed.

As set forth above, according to an exemplary embodiment in the present disclosure, warpage of the cover portion or the step portion between the internal electrode and the margin part may be significantly decreased.

In addition, the occurrence of the delamination due to the warpage of the cover portion or the step portion between the internal electrode and the margin part in the multilayer electronic component may be suppressed.

Further, the moisture resistance reliability of the multilayer electronic component may be improved by suppressing the warpage of the cover portion or the step portion between the internal electrode and the margin part in the multilayer electronic component.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
   a body including a dielectric layer and first and second internal electrode layers disposed with the dielectric layer interposed therebetween and having first and second surfaces opposing each other in a first direction of the body, third and fourth surfaces connected to the first and second surfaces and opposing each other in a second direction of the body, and fifth and sixth surfaces connected to the first to fourth surfaces and opposing each other in a third direction of the body;
   a first external electrode disposed on the third surface and connected to the first internal electrode layer; and
   a second external electrode disposed on the fourth surface and connected to the second internal electrode layer,
   wherein the first internal electrode layer includes a first internal electrode, first step compensation portions disposed to be spaced apart from both ends of the first internal electrode in the third direction, the third surface, and the fourth surface, and first intermediate electrodes disposed between the first internal electrode and the first step compensation portions and disposed to be spaced apart from the third surface and the fourth surface, and
   $0.05 \leq D2/D4 \leq 0.4$ in which D2 is a length of the first intermediate electrodes in the third direction and D4 is a length of the first step compensation portions in the third direction.

2. The multilayer electronic component of claim 1, wherein the second internal electrode layer includes a second internal electrode, second step compensation portions disposed to be spaced apart from both ends of the second internal electrode in the third direction, the third surface, and the fourth surface, and second intermediate electrodes disposed between the second internal electrode and the second step compensation portions and disposed to be spaced apart from the third surface and the fourth surface.

3. The multilayer electronic component of claim 1, wherein $0.1 \leq D2/D4 \leq 0.3$.

4. The multilayer electronic component of claim 1, wherein $10\ \mu m \leq D1 \leq 20\ \mu m$ and $10\ \mu m \leq D3 \leq 20\ \mu m$ in which D1 is a length between the first internal electrode and the first intermediate electrodes spaced apart from each other in the third direction and D3 is a length between the first intermediate electrodes and the first step compensation portions spaced apart from each other in the third direction.

5. The multilayer electronic component of claim 1, wherein the first step compensation portions include body portions disposed to be spaced apart from the fifth surface and the sixth surface and lead portions extending from the body portions and in contact with the fifth surface or the sixth surface, respectively.

6. The multilayer electronic component of claim 5, wherein the lead portions are disposed to be spaced apart from the first and second external electrodes.

7. The multilayer electronic component of claim 1, wherein a thickness of one of the first and second internal electrode layers is 650 nm or more.

8. The multilayer electronic component of claim 1, wherein a thickness of the dielectric layer is 1.5 μm or more.

9. The multilayer electronic component of claim 1, wherein the first step compensation portions are in contact with at least one of the fifth surface and the sixth surface.

10. A multilayer electronic component comprising:
    a body including a dielectric layer and first and second internal electrode layers disposed with the dielectric layer interposed therebetween and having first and second surfaces opposing each other in a first direction of the body, third and fourth surfaces connected to the first and second surfaces and opposing each other in a second direction of the body, and fifth and sixth surfaces connected to the first to fourth surfaces and opposing each other in a third direction of the body;
    a first external electrode disposed on the third surface and connected to the first internal electrode layer; and
    a second external electrode disposed on the fourth surface and connected to the second internal electrode layer,
    wherein the first internal electrode layer includes a first internal electrode and first step compensation portions disposed to be spaced apart from both ends of the first internal electrode in the third direction, the third surface, and the fourth surface,
    the first step compensation portions are disposed to be in contact with at least one of the fifth surface and the sixth surface, and
    a length, in the second direction, of an outer end in the third direction of the first step compensation portions is less than a length, in the second direction, of an internal end in the third direction of the first step compensation portions.

11. The multilayer electronic component of claim 10, wherein the second internal electrode layer includes a second internal electrode and second step compensation portions disposed to be spaced apart from both ends of the second internal electrode in the third direction, the third surface, and the fourth surface, and
    the second step compensation portions are disposed to be in contact with at least one of the fifth surface and the sixth surface.

12. The multilayer electronic component of claim 10, wherein the body includes a capacitance forming part forming capacitance by including the first and second internal electrodes disposed with the dielectric layer interposed therebetween and includes margin portions disposed on opposite surfaces of the capacitance forming part in the third direction, respectively, and
    $0.1 \leq D5/D6 \leq 0.3$ in which D5 is a distance between the first internal electrode and the first step compensation portions spaced apart from each other in the third direction and D6 is a length of the margin portions in the third direction.

13. The multilayer electronic component of claim 10, wherein the first step compensation portions include body portions disposed to be spaced apart from the fifth surface and the sixth surface and lead portions extending from the body portions and in contact with the fifth surface or the sixth surface, respectively, and the body portions include the internal end and the lead portions include the outer end.

14. The multilayer electronic component of claim 13, wherein the lead portions are disposed to be spaced apart from the first and second external electrodes.

15. The multilayer electronic component of claim 13, wherein a size of each of the lead portions in the second direction is smaller than a size of each of the body portions in the second direction.

16. The multilayer electronic component of claim 10, wherein a thickness of one of the first and second internal electrode layers is 650 nm or more.

17. The multilayer electronic component of claim 10, wherein a thickness of the dielectric layer is 1.5 μm or more.

18. The multilayer electronic component of claim 10, wherein the first internal electrode layer further includes two or more intermediate electrodes between the first internal electrode and the first step compensation portions.

19. The multilayer electronic component of claim 10, wherein $0.05 \leq D5/D6 \leq 0.4$ in which D5 is a distance between the first internal electrode and the first step compensation portions spaced apart from each other in the third direction and D6 is a length of the margin portions in the third direction.

20. A multilayer electronic component comprising:

a body including a dielectric layer and first and second internal electrode layers disposed with the dielectric layer interposed therebetween and having first and second surfaces opposing each other in a first direction of the body, third and fourth surfaces connected to the first and second surfaces and opposing each other in a second direction of the body, and fifth and sixth surfaces connected to the first to fourth surfaces and opposing each other in a third direction of the body;

a first external electrode disposed on the third surface and connected to the first internal electrode layer; and a second external electrode disposed on the fourth surface and connected to the second internal electrode layer, wherein the first internal electrode layer includes a first internal electrode and first step compensation portions disposed to be spaced apart from both ends of the first internal electrode in the third direction, the third surface, and the fourth surface, the first step compensation portions are disposed to be in contact with at least one of the fifth surface and the sixth surface, and the first step compensation portions are closer to the fourth surface than the first internal electrode.

* * * * *